United States Patent
Hwang et al.

(10) Patent No.: US 11,194,049 B2
(45) Date of Patent: Dec. 7, 2021

(54) RELAY-BASED COMMUNICATION METHOD FOR COMMUNICATION TERMINAL

(71) Applicant: Samsung Electronics Co., Ltd, Suwon-si (KR)

(72) Inventors: June Hwang, Incheon (KR); Hyun-Jeong Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 403 days.

(21) Appl. No.: 16/063,664

(22) PCT Filed: Dec. 13, 2016

(86) PCT No.: PCT/KR2016/014568
§ 371 (c)(1),
(2) Date: Jun. 18, 2018

(87) PCT Pub. No.: WO2017/105052
PCT Pub. Date: Jun. 22, 2017

(65) Prior Publication Data
US 2019/0004179 A1     Jan. 3, 2019

(30) Foreign Application Priority Data
Dec. 18, 2015 (KR) .................. 10-2015-0181639

(51) Int. Cl.
*G01S 19/03*     (2010.01)
*H04W 88/04*     (2009.01)
(Continued)

(52) U.S. Cl.
CPC .............. *G01S 19/03* (2013.01); *G01S 19/42* (2013.01); *H04W 4/46* (2018.02); *H04W 88/04* (2013.01);
(Continued)

(58) Field of Classification Search
CPC .......... G01S 19/03; G01S 19/42; H04W 4/46; H04W 4/44; H04W 4/90; H04W 4/025;
(Continued)

(56) References Cited

U.S. PATENT DOCUMENTS 7,653,485 B2 *   1/2010   Fujita ................. G01C 21/3476
                                                         701/411
8,150,612 B2 *   4/2012   Nagase ............ G08G 1/096811
                                                         701/118
(Continued)

FOREIGN PATENT DOCUMENTS

KR    10-2012-0134631 A    12/2012
KR    10-2014-0058160 A    5/2014
(Continued)

OTHER PUBLICATIONS

International Search Report dated Feb. 17, 2017 in connection with International Patent Application No. PCT/KR2016/014568.
(Continued)

*Primary Examiner* — Chuong P Nguyen

(57) ABSTRACT

Disclosed is a 5G or pre-5G communication system for supporting a data transmission rate higher than that of a 4G communication system such as LTE. Provided in the present disclosure is a relay-based communication method for a communication terminal provided in a vehicle, comprising the steps of: acquiring global positioning system (GPS) coordinates of the vehicle; determining a traveling direction of the vehicle on the basis of map information and the GPS coordinates; sensing a traveling lane of the vehicle; generating a location code including information on the GPS coordinates, the traveling direction, and the traveling lane; and generating a message, which includes the generated location code, and transmitting the message.

8 Claims, 28 Drawing Sheets

(51) Int. Cl.

| | | |
|---|---|---|
| *H04W 4/46* | (2018.01) | |
| *G01S 19/42* | (2010.01) | |
| *H04B 7/185* | (2006.01) | |
| *H04W 4/40* | (2018.01) | |
| *H04W 64/00* | (2009.01) | |
| *H04B 7/155* | (2006.01) | |
| *H04W 40/20* | (2009.01) | |
| *H04W 84/18* | (2009.01) | |
| *H04W 4/44* | (2018.01) | |
| *H04W 4/02* | (2018.01) | |
| *H04W 4/90* | (2018.01) | |
| *H04W 84/04* | (2009.01) | |

(52) U.S. Cl.
CPC .......... *H04B 7/15507* (2013.01); *H04B 7/185* (2013.01); *H04W 4/025* (2013.01); *H04W 4/40* (2018.02); *H04W 4/44* (2018.02); *H04W 4/90* (2018.02); *H04W 40/20* (2013.01); *H04W 64/00* (2013.01); *H04W 84/047* (2013.01); *H04W 84/18* (2013.01)

(58) Field of Classification Search
CPC ..... H04W 40/20; H04W 64/00; H04W 84/18; H04W 88/04; H04B 7/185
USPC ........ 342/357.4, 357.25, 457; 701/445, 469; 340/995.27
See application file for complete search history.

(56) References Cited

U.S. PATENT DOCUMENTS

| | | | | |
|---|---|---|---|---|
| 8,340,893 B2 * | 12/2012 | Yamaguchi | ............ | G08G 1/166 701/301 |
| 8,352,112 B2 * | 1/2013 | Mudalige | ............... | G08G 1/164 701/24 |
| 8,824,997 B2 * | 9/2014 | Gehlen | ............ | G08G 1/096716 455/404.1 |
| 8,972,175 B2 * | 3/2015 | Annapureddy | .. | G08G 1/096791 701/423 |
| 9,256,995 B2 * | 2/2016 | Kawai | ................... | G07C 5/0808 |
| 9,257,041 B2 * | 2/2016 | Scofield | ............... | G08G 1/0104 |
| 9,336,681 B2 * | 5/2016 | Annapureddy | ......... | H04W 4/40 |
| 9,420,489 B2 * | 8/2016 | Sakata | ................ | H04L 12/6418 |
| 10,001,380 B2 * | 6/2018 | Annapureddy | ....... | G06F 21/552 |
| 2007/0168110 A1 * | 7/2007 | Jiang | ................ | G08G 1/096775 701/117 |
| 2009/0285197 A1 | 11/2009 | Chen et al. | | |
| 2010/0241344 A1 * | 9/2010 | Nagase | ............ | G08G 1/096811 701/118 |
| 2012/0226391 A1 * | 9/2012 | Fryer | ................. | G01C 21/3407 701/1 |
| 2013/0059558 A1 * | 3/2013 | Gehlen | ................... | G08G 1/162 455/404.1 |
| 2013/0301406 A1 * | 11/2013 | Sakata | ................... | G08G 1/162 370/229 |

FOREIGN PATENT DOCUMENTS

| | | |
|---|---|---|
| KR | 10-2014-0102371 A | 8/2014 |
| KR | 10-1439019 B1 | 9/2014 |
| KR | 10-2015-0098071 A | 8/2015 |

OTHER PUBLICATIONS

Written Opinion of the International Searching Authority dated Feb. 17, 2017 in connection with International Patent Application No. PCT/KR2016/014568.

* cited by examiner

RELAY-BASED COMMUNICATION METHOD FOR COMMUNICATION TERMINAL

CROSS-REFERENCE TO RELATED APPLICATIONS AND CLAIM OF PRIORITY

This application is a 371 of International Application No. PCT/KR2016/014568 filed Dec. 13, 2016, which claims priority to Korean Patent Application No. 10-2015-0181639 filed Dec. 18, 2015, the disclosures of which are herein incorporated by reference in their entirety.

BACKGROUND

1. Field

The present disclosure relates to a communication scheme of a communication terminal, and more particularly, to a relay-based broadcast communication method and apparatus.

2. Description of Related Art

To satisfy demands for wireless data traffic having increased since commercialization of $4^{th}$-Generation (4G) communication systems, efforts have been made to develop improved $5^{th}$-Generation (5G) communication systems or pre-5G communication systems. For this reason, the 5G communication system or the pre-5G communication system is also called a beyond-4G-network communication system or a post-Long-Term Evolution (LTE) system.

To achieve a high data rate, implementation of the 5G communication system in an ultra-high frequency (mm-Wave) band (e.g., a 60 GHz band) is under consideration. In the 5G communication system, beamforming, massive multi-input multi-output (MIMO), full dimensional MIMO (FD-MIMO), an array antenna, analog beamforming, and large-scale antenna technologies have been discussed to alleviate a propagation path loss and to increase a propagation distance in the ultra-high frequency band.

For system network improvement, in the 5G communication system, techniques such as an evolved small cell, an advanced small cell, a cloud radio access network (RAN), an ultra-dense network, a device to device (D2D) communication, a wireless backhaul, a moving network, cooperative communication, coordinated multi-points (CoMPs), and interference cancellation have been developed.

In the 5G system, advanced coding modulation (ACM) schemes including hybrid frequency-shift keying (FSK) and quadrature amplitude modulation (QAM) modulation (FQAM) and sliding window superposition coding (SWSC), and advanced access schemes including filter bank multi carrier (FBMC), non-orthogonal multiple access (NOMA), and sparse code multiple access (SCMA) have been developed.

Internet, which is a human-oriented connectivity network where humans generate and consume information, is now evolving to the Internet of Things (IoT) where distributed entities, such as things, exchange and process information. The Internet of Everything (IoE) has also emerged, which is a combination of the IoT technology and the Big Data processing technology through connection with a cloud server.

As technology elements, such as sensing technology, wired/wireless communication and network infrastructure, service interface technology, and security technology, have been demanded for IoT implementation, a sensor network, a Machine to Machine (M2M), Machine Type Communication (MTC), and so forth have been recently researched for connection between things.

Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances, advanced medical services, and so forth through convergence and combination between existing IT and various industries.

When communication is performed between terminals or user equipments (UEs) in a broadcast manner, any UE in a communication coverage may receive a message and retransmit the received message. In this way, a UE performing communication with another UE may deliver an urgent message remotely without a base station (BS) or an evolved NodeB (eNB).

In a vehicle to everything (V2X) system or a disaster situation, application schemes using relay such as push to talk (PTT) have received attention. The PTT has been used as a concept of an interactive call service, but recently, has been provided in a form that enables a data service for multiple users or a group thereof. For example, a UE using the PTT may transmit and receive data to and from multiple users or a group thereof on a real-time basis and play the data transmitted and received in real time.

When a speed of a moving vehicle is high in the V2X system or in an urgent situation (e.g., a disaster situation) where an eNB is lost, it may be difficult for a source UE (or a source vehicle or a UE sending a message) to deliver a desired message to a target UE (or a target vehicle) through single wireless transmission. To address such a difficulty, a relay method may be used. Other UEs having received a message from a source UE using a relay method do not deliver the received message directly to a target UE without delivering the same to a network device such as the already lost eNB or a gateway (GW) to deliver the received message to the target UE, thereby reducing a communication time between UEs.

In the disaster situation, there may be no eNB in a communication coverage of the source UE, such that a relay operation may be used between the source UE and an eNB outside the coverage to support the PTT service.

The relay method is based on broadcast-type communication. All the other nodes having received the message from the source UE may be relay candidate nodes. Thus, broadcast flooding (delivery to all the connected other nodes) occurring due to all the relay candidate nodes may cause relay explosion.

Once a source node transmits a data packet, all UEs in a radio coverage of the source node may be relay nodes which receive the data packet and at the same time, relay the received packet. In this case, the relay UEs are highly likely to use the same radio resource, and communication using the same resource eventually causes collision or interference in a reception end. This phenomenon lowers data reliability in the reception end.

Separately, when a source UE performs IP communication with a target UE through routing, a route is previously set up before data transmission. In this case, for safe communication, a lot of prior procedures (that is, prior message transmission and reception) are needed. In particular, a prior procedure for authorization and IP address allocation for a UE requires much time, causing a long delay time in UE-to-UE IP communication through routing.

SUMMARY

The present disclosure provides a method for preventing radio resource waste and communication collision that may occur when UE-to-UE communication is performed by using a broadcast-based relay scheme.

The present disclosure provides a method for limiting a UE that is to perform relay based on region information when UE-to-UE communication is performed by using a broadcast-based relay scheme.

The present disclosure provides a method for limiting a relay retransmission UE of a received broadcast message based on region information when a UE has to deliver a message in UE-to-UE communication or has to continuously deliver the received broadcast message to a nearby other UE in a relay manner.

The present disclosure provides a method in which to prevent flooding due to relay transmission, a UE to receive a broadcast message is notified based on a location of a source UE, thereby limiting a UE needing to receive the message and allowing only the limited UE to perform relay, thus preventing unnecessary data reception and retransmission and improving communication reliability.

The present disclosure proposes a relay-based communication method of a communication user equipment (UE) provided in a vehicle, the relay-based communication method including obtaining global positioning system (GPS) coordinates of the vehicle, determining a traveling direction of the vehicle based on map information and the GPS coordinates, detecting a traveling lane of the vehicle, generating a location code including information about the GPS coordinates, the traveling direction, and the traveling lane, and generating a message including the generated location code and sending the message.

The present disclosure proposes a relay-based communication method of a communication UE provided in a vehicle, the relay-based communication method including obtaining GPS coordinates of the vehicle, receiving a message including a location code from another vehicle, determining whether to relay the message based on the GPS coordinates and information indicated by the location code, and decoding and relaying the message based on the determination, in which the location code includes information about GPS coordinates, a traveling direction, and a traveling lane of the other vehicle.

The present disclosure proposes a relay-based communication UE provided in a vehicle, the relay-based communication UE including a controller configured to obtain GPS coordinates of the vehicle, to determine a traveling direction of the vehicle based on map information and the GPS coordinates, to detect a traveling lane of the vehicle, to generate a location code including information about the GPS coordinates, the traveling direction, and the traveling lane, and to generate a message including the generated location code and sending the message, and a communicator configured to send the generated message.

The present disclosure proposes a relay-based communication UE provided in a vehicle, the relay-based communication UE including a communicator configured to receive a message including a location code from another vehicle and a controller configured to obtain GPS coordinates of the vehicle, to determine whether to relay the message based on the GPS coordinates and information indicated by the location code, and to decode and relay the message based on the determination, in which the location code includes information about GPS coordinates, a traveling direction, and a traveling lane of the other vehicle.

Detailed matters of other embodiments are included in a detailed description and drawings.

According to embodiments of the present disclosure, at least effects described below may be obtained.

The present disclosure solves relay transmission explosion, thus preventing unnecessary reception/retransmission and improving communication reliability.

Moreover, the present disclosure reduces a delay time of UE-to-UE (end-to-end) communication by reducing a time needed for setup in data transmission after relay node selection.

The effects according to the present disclosure are not limited to the illustrated and described matters, and other various effects are included therein.

DETAILED DESCRIPTION

Figure 1:
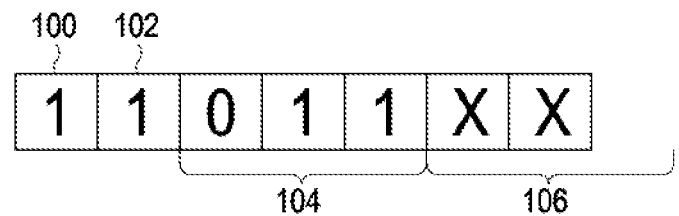
FIG. 1 illustrates a configuration of a code according to the present disclosure.

Hereinafter, embodiments of the present disclosure are described in detail with reference to the accompanying drawings. In the following description of the present disclosure, a detailed description of well-known functions or elements associated with the present disclosure will be omitted if it unnecessarily obscures the subject matter of the present disclosure. The terms as used herein are defined considering the functions in the present disclosure and may be replaced with other terms according to the intention or practice of the user or operator. Therefore, the terms should be defined based on the overall disclosure.

Before detailing the present disclosure, some terms as used herein may be interpreted as follows, for example. However, it should be noted that the present disclosure is not limited thereto.

The base station is an entity communicating with a UE and may be denoted BS, NodeB (NB), eNodeB (eNB), or AP (Access Point).

The user equipment is an entity that communicates with the base station or other UEs, and may also be referred to as a node, a UE, a mobile station (MS), a mobile equipment (ME), a device, a UE, or the like. In the present disclosure, a V2X system will be described as an example, such that a UE may be understood as a vehicle or a communication UE provided in the vehicle.

The present disclosure roughly proposes two methods. First, a relay candidate node is filtered (or limited) using a code in UE-to-UE communication through broadcast-based relay, and second, an IP address is allocated in advance in UE-to-UE communication through relay by performing routing.

A description will be first made of a scheme to filter a relay candidate node by using a code in UE-to-UE communication.

A source UE may incorporate a code described therein when generating a data packet for sending a message. The code may be called a location code as a code for indicating location information of the source UE. The code may be included in any message sent by the source UE, but more specifically, a message to include the code will be described.

Once the source UE sends a data packet including the code, a UE in a communication coverage of the source UE (that is, a proximity UE) receives the data packet, reads the code in the data packet to compare a location of the proximity UE with the location of the source UE, and determines whether to relay the received data packet. By doing so, the message sent by the source UE may be relayed by a proximity UE that is filtered according to a predetermined condition, instead of by every proximity UE. In this way, the code used for the filtering may prevent the relayed data packet from being unnecessarily broadcasted and data packets from colliding with each other in a receiving UE.

The code according to the present disclosure may be generated based on one or more information corresponding to the location of the source UE. For example, the code may be generated based on at least one of i) information about whether the UE is located on a road or off the road, ii) information about on which floor of a road the UE is located on (for the multi-floor road), iii) information about a traveling direction (for example, up or down and north or south), and iv) information about a driving lane.

The code may be designed from positioning of a vehicle. In the V2X system, it is assumed that lane discovery of the vehicle is possible and location information acquisition of the vehicle through a global positioning system (GPS) is possible at all times. In this case, a map application may detect a traveling direction of the vehicle based on GPS location information.

Generally, a V2X service requires directivity notification with respect to a particular event. For example, if collision occurs on an up line of a traveling road, a colliding vehicle generates a message related to a collision event and may notify the message only to vehicles in a traveling direction (that is, an up direction) of the vehicle. A road in an opposite direction (that is, a down direction) and a vehicle in the opposite direction are not largely relevant to the collision, but rather, a notification regarding the collision may cause unnecessary alert to a driver of a vehicle driving on the road in the opposite direction, leading to another accident.

FIG. 1 illustrates a configuration of a code according to the present disclosure.

The code illustrated in FIG. 1 may include an on-road/off-road indication field 100, a south/north indication field 102, and a lane indication field 104. For example, the code means that a transmitting UE (that is, a transmitting vehicle) is on a road as indicated by 100, travels in the north direction as indicated by 102, and is on a third lane as indicated by 104. The code designing described with reference to FIG. 1 is merely an example, and an arrangement order of information included in the code and a coding scheme of particular information may be changed. For instance, the lane indication field 104 may express a value (that is, 3) indicating a traveling lane (that is, a third lane) as a binary value (that is, '011') as shown in FIG. 1, or for bits corresponding to the number of lanes, only the traveling lane may be expressed by '1' and the other lanes may be expressed by '0s' (for example, for a total of three lanes, '001' may be used to indicate the third lane). The code may further include a reserve field 106 for other uses.

Figure 2:
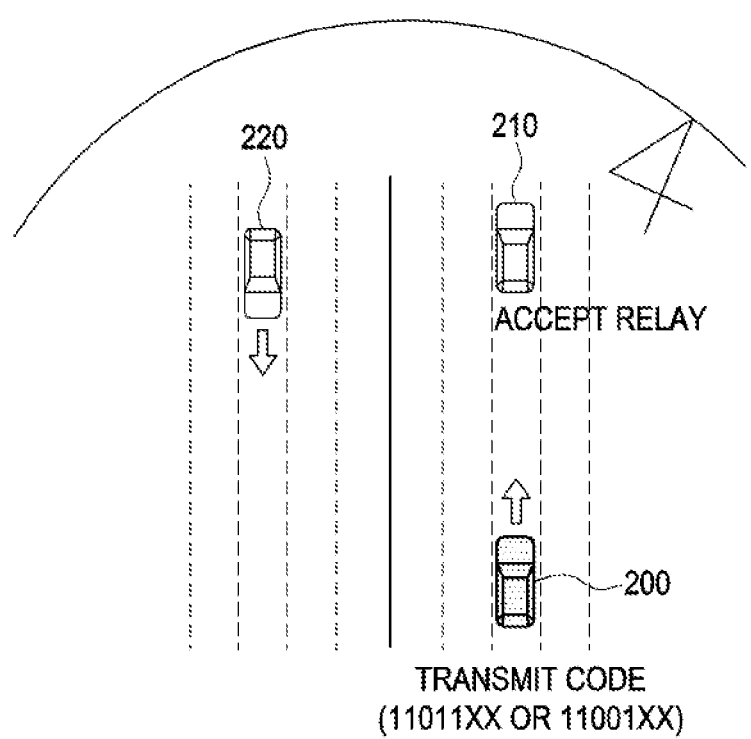
FIG. 2 illustrates a traveling road when a proximity vehicle determines whether to relay a message sent using a code according to the present disclosure.

FIG. 2 illustrates a traveling road when a proximity vehicle determines whether to relay a message sent using a code according to the present disclosure.

In FIG. 2, a first vehicle 200 driving on the third lane in the north direction ('1') in an on-road ('1') state generates and sends a message. The message may be expressed, for example, as '11011XX' or '11001XX'. A second vehicle 210 in the same traveling direction as the first vehicle 200 may receive and relay the message, but a third vehicle 220 traveling in the opposite direction discards the received message without decoding or relaying the same because a traveling direction indicated by a code included in the received message (that is, a traveling direction) is different from that of the third vehicle 220.

The code according to the present disclosure may be generated further based GPS location coordinate information of a source UE.

One second (1") actually has a granularity of about 37 meters on the ground on GPS coordinates, such that in many cases, a vehicle may recognize a relative position with respect to other vehicles on the road merely by using GPS coordinates information based on second unit or less (for example, 1 second 05). The GPS coordinates information may be added to the code. More specifically, information based on the second unit or less corresponding to a latitude or a longitude may be added to the lane indication field in the code. As mentioned above, the arrangement order of the information of the code may be implemented differently.

When the message including the code having the GPS coordinates information is broadcast, a receiving UE compares the GPS coordinates information with its own location information (that is, GPS coordinates information) to identify a relative location of a transmitting UE having transmitted the message (for example, ahead of or behind the transmitting UE). Thus, the receiving UE may determine whether to receive and relay the received message based on the relative location thereof.

For this end, the code according to the present disclosure may further include information indicating a direction in which the message is to be delivered (that is, a target direction) as well as the information indicating the location of the source UE. For example, when one bit is used to indicate the target direction, '0' may mean that the target direction is ahead of the source UE (that is, the traveling direction) and '1' may mean that the target direction is behind the source UE (that is, the opposite direction to the traveling direction). Neighboring UEs having received the message may be aware of their relative locations with respect to the source UE and determine a desired target direction desired by the source UE, thus selectively decoding or relaying the message according to the determination.

Figure 3:
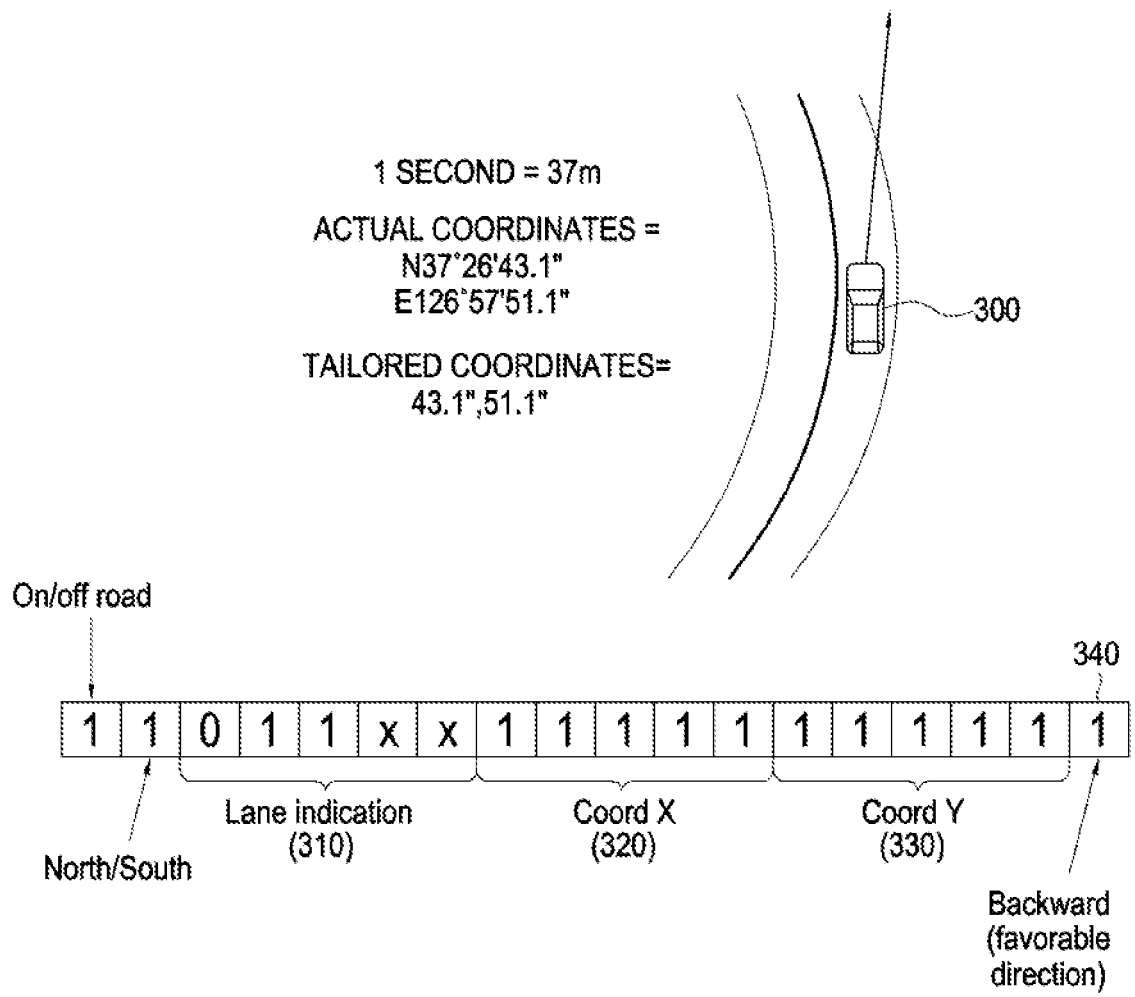
FIG. 3 illustrates a traveling road of a vehicle using a code according to the present disclosure and a configuration of the code.

FIG. 3 illustrates a traveling road of a vehicle using a code according to the present disclosure and a configuration of the code.

In FIG. 3, when GPS coordinates of a vehicle 300 traveling on the road are 37 degrees 26 minutes 43.1 seconds north latitude and 126 degrees 57 minutes 51.1 seconds east longitude, tailored coordinates are 43.1 seconds and 51.1 seconds. The tailored coordinate information may be carried in an x-coordinate field 320 and a y-coordinate field 330 arranged behind the lane indication field 310. The code may further include a target direction field 340 of one-bit information (for example, '1' indicates the behind direction of the source UE) indicating a desired direction (that is, the target direction).

Figure 4:
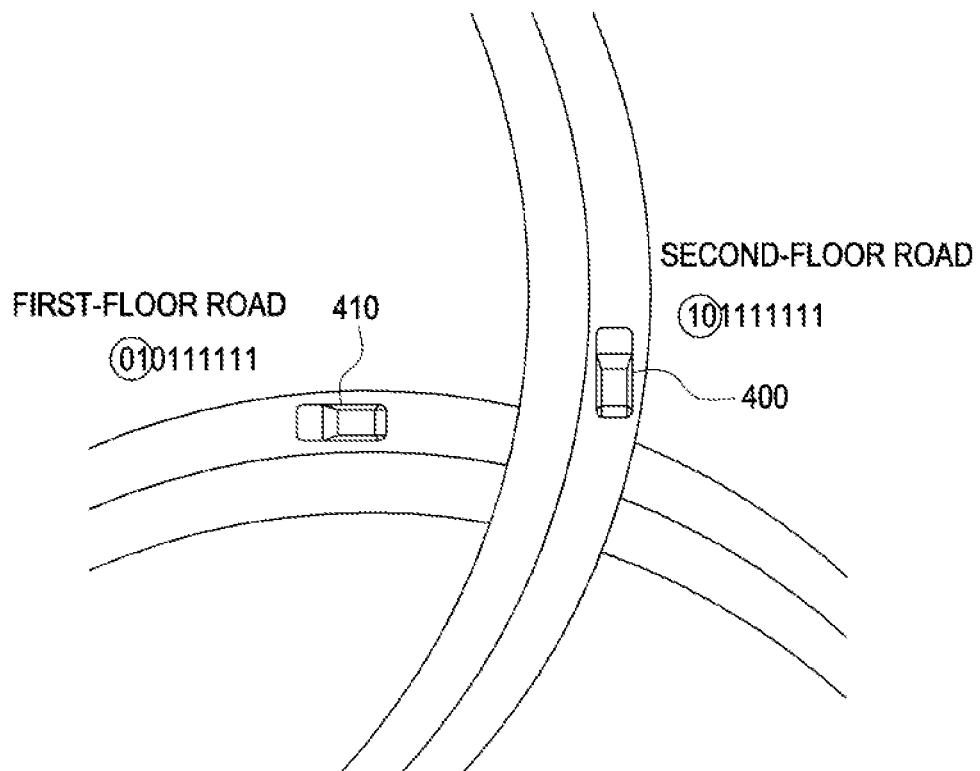
FIG. 4 illustrates a traveling road when a code according to the present disclosure includes floor information of the road.

FIG. 4 illustrates a traveling road when the code according to the present disclosure includes floor information of the road.

As stated above, the code according to the present disclosure may indicate a floor on which the vehicle is traveling on multi-floor roads. For an overpass or highway ramp, several roads may overlap and, in this case, in spite of having the same GPS coordinates, vehicles may actually travel on different-floor roads. In FIG. 4, a first vehicle 400 and a second vehicle 410 are traveling on a highway ramp and have the same values corresponding to GPS coordinates, but information about floors are indicated differently (by '10' and '01', respectively).

The vehicle may calculate a floor of a road on which the vehicle is traveling, by comparing previous values (past values) and current values of GPS information and map information. Thus, the vehicle may incorporate information about a floor of a road on which the vehicle is traveling into the code. Selectively, the information about the floor of the road may be included in place of or in addition to information indicating on-road/off-road.

Figure 5:
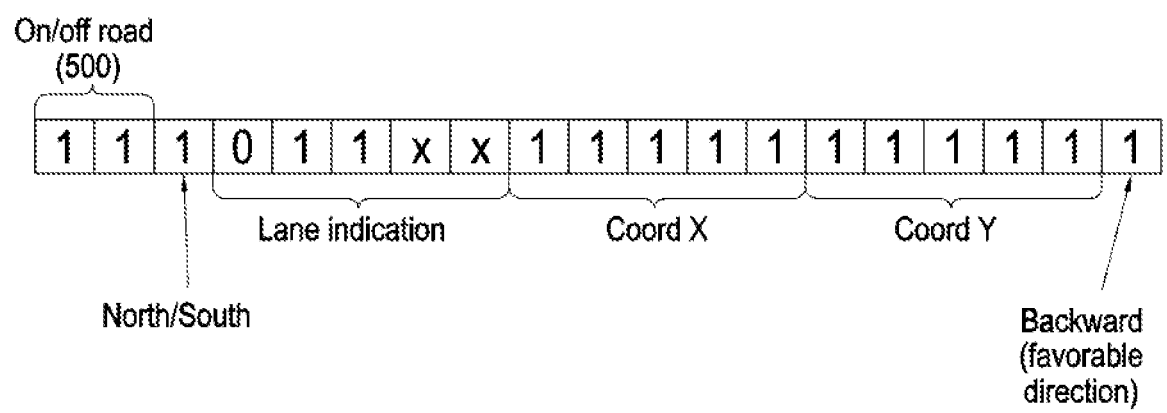
FIG. 5 illustrates another example of a configuration of a code according to the present disclosure.

FIG. 5 illustrates another example of a configuration of a code according to the present disclosure.

In FIG. 5, a 2-bit field 500 for indicating on-road/off-road is used to indicate floor information of a road. The floor information is expressed with 2 bits, in which '01' indicates the first-floor road and '10' indicates the second-floor road. The expression method may be changed without being limited to this example. For example, for bits corresponding to a total number of floors, a floor on which the vehicle is traveling may be expressed by '1' and the other floors may be expressed by '0'. In this way, other vehicles receiving the message including the code may determine whether the message is relevant to them (that is, the message is sent from a vehicle traveling on the same floor as theirs).

Figure 6:
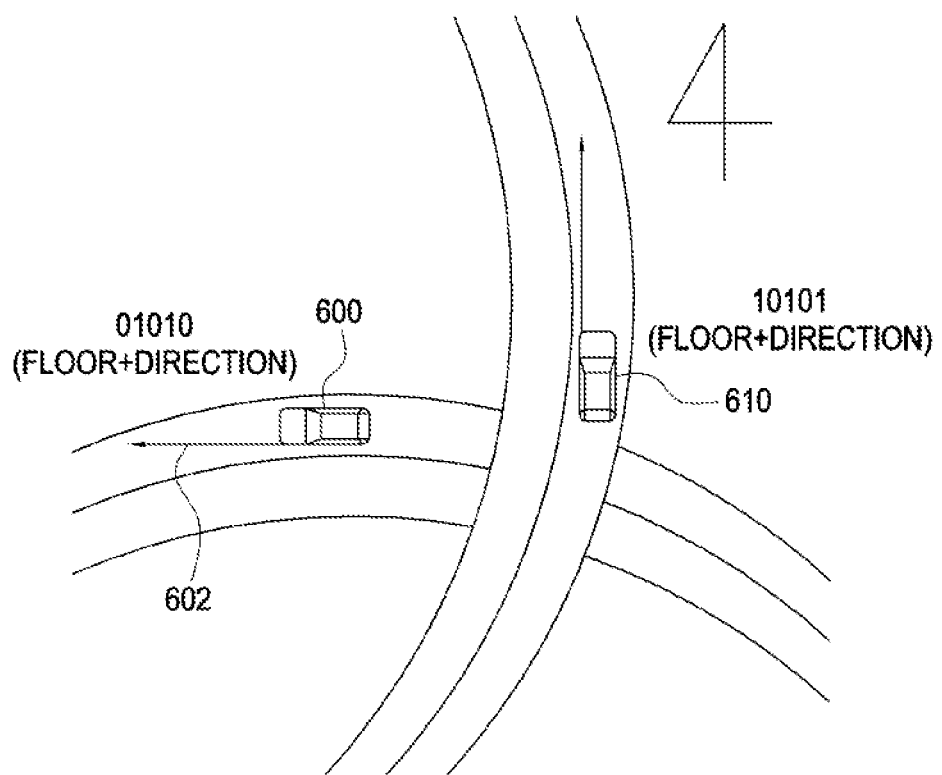
FIG. 6 illustrates a traveling road when a code according to the present disclosure indicates a complex traveling direction.

FIG. 6 illustrates a traveling road when the code according to the present disclosure indicates a complex traveling direction.

In FIG. 1, the south/north indication field 102 assumes that all traveling roads are basically directed south/north (that is, up/down). However, the direction of the traveling road may not be simply classified as south/north. For example, in FIG. 6, for a first vehicle 600, a vector 602 indicating a traveling direction of the first vehicle 600 does not include a component in the south/north direction. Thus, the classification of the traveling direction of the first vehicle 600 as south/north may not be perfect. Therefore, selectively, by checking an east/west vector component simultaneously with the south/north vector component, a direction on a map in which the first vehicle 600 is directed may be clearly determined through a complex traveling direction indication field.

Figure 7:
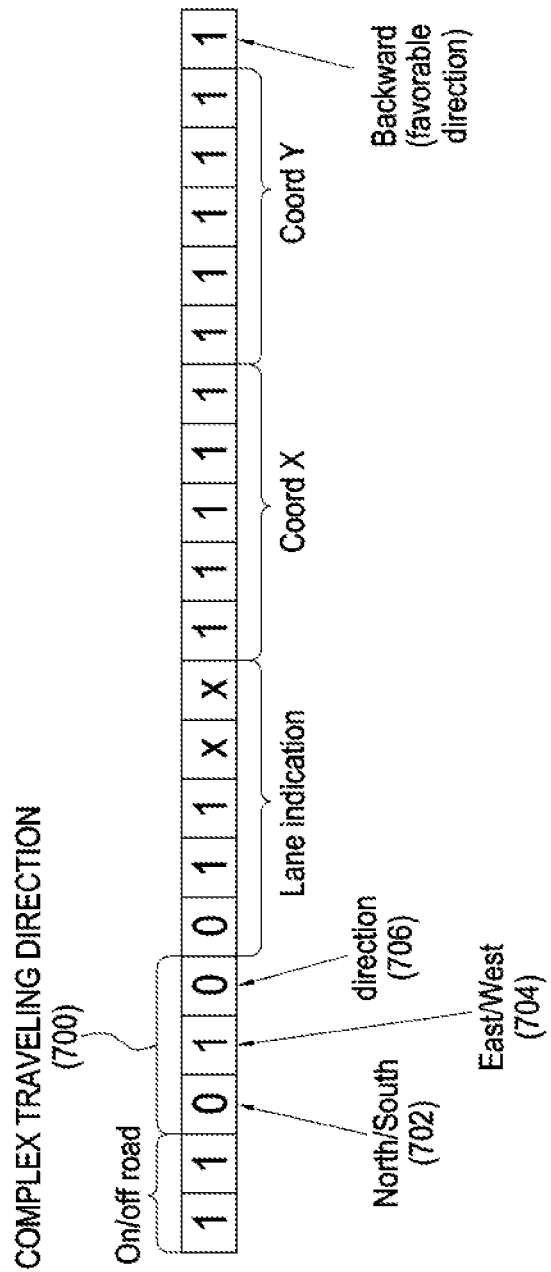
FIG. 7 illustrates a configuration of a code including a complex traveling direction indication field according to the present disclosure.

FIG. 7 illustrates a configuration of a code including a complex traveling direction indication field according to the present disclosure.

A complex traveling direction indication field 700 may include three bits. More specifically, the three bits may include a south/north bit 702, an east/west bit 704, and an actual direction bit 706. In this case, the vehicle may express a bit having the stronger direction between the south/north bit 702 and the east/west bit 704 with '1' and indicate the actual direction of the bit expressed with '1' in the actual direction bit 706 by '0' or '1'. The actual direction may be indicated by '1' for north in the south/north bit, and by '1' for west in the east/west bit. Needless to say, the indication may be opposite to this example.

For example, in FIG. 6, the traveling first vehicle 600 has the stronger east/west direction than the south/north direction, such that the east/west bit may be expressed with '1', the south/north bit may be expressed with '0', and the actual direction bit may be '1' because the actual direction is west. In this case, the complex traveling direction field of the first vehicle 600 may be expressed with '011'. In FIG. 6, the traveling second vehicle 610 has the stronger south/north direction than the east/west direction, such that the south/north bit may be expressed with '1', the east/west bit may be expressed with '0', and the actual direction bit may be '1' because the actual direction is north. In this case, the complex traveling direction field of the second vehicle 610 may be expressed with '101'.

Figure 8:
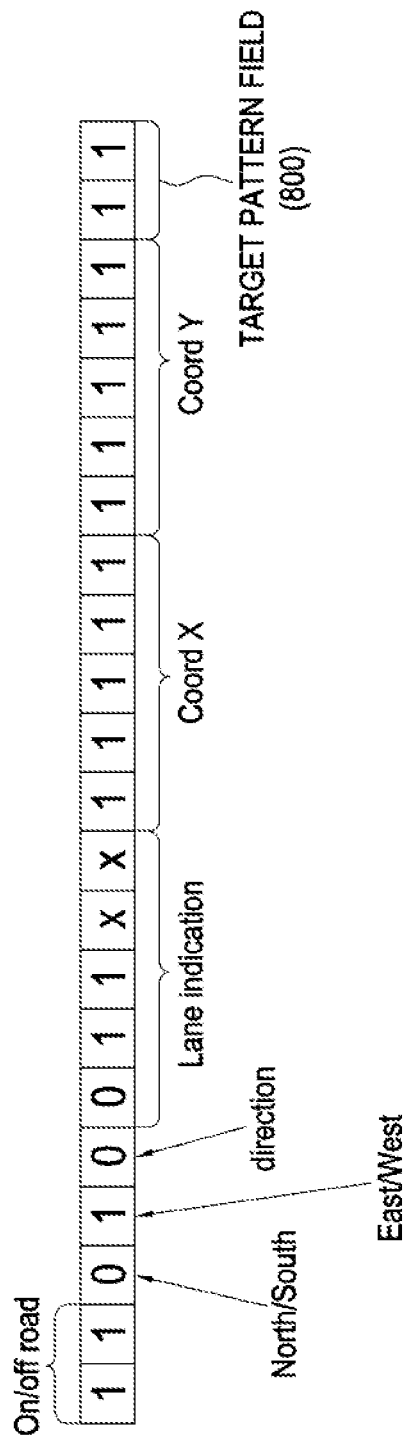
FIG. 8 illustrates a configuration of a code including a target pattern field according to the present disclosure.

FIG. 8 illustrates a configuration of a code including a target pattern field according to the present disclosure.

In FIG. 3, a source vehicle indicates a direction in which the source vehicle desires to deliver a message through the target direction field 340 included in the code. In FIG. 8, the code includes a 2-bit target pattern field 800 instead of the target direction field, and the source vehicle indicates a detailed pattern regarding a direction and a region through the target pattern field 800. The pattern regarding the direction and the region may be defined in advance, and the target pattern field 800 may include an index of the defined pattern. For example, the pattern may include 'forward line' indicated by an index '00', 'backward line' indicated by '01', 'forward triangle' indicated by '10', and 'backward triangle' indicated by '11'.

FIGS. 9A-9D illustrate a road state when a message is delivered using a target pattern field of a code according to the present disclosure.

Figure 9A:
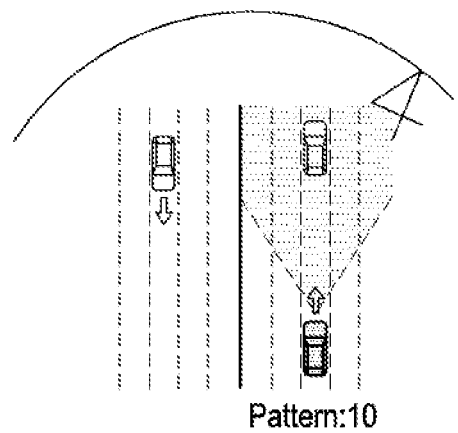
FIGS. 9A-9D illustrate a road state when a message is delivered using a target pattern field of a code according to the present disclosure.
Figure 9B:
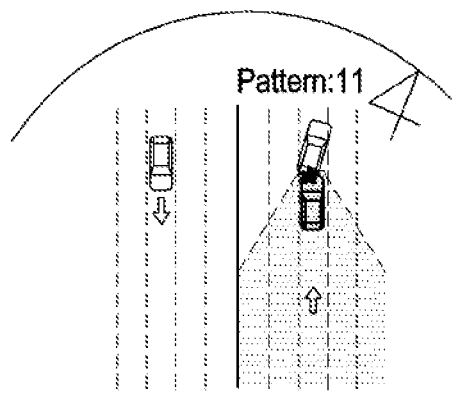
Figure 9C:
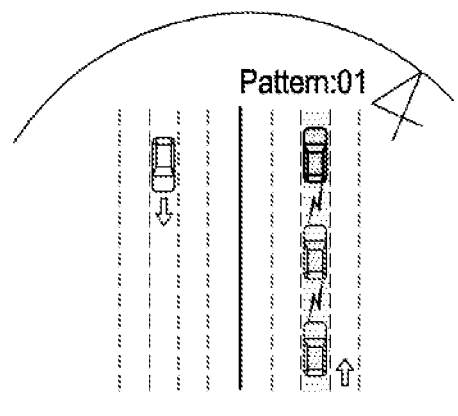
Figure 9D:
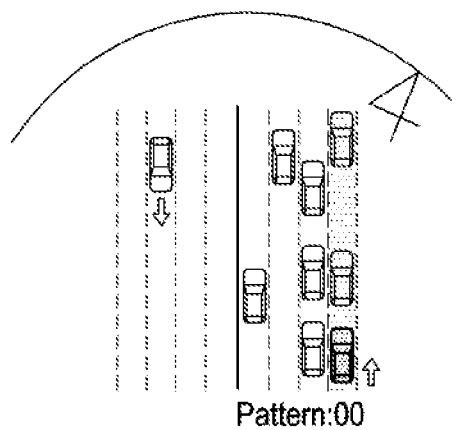

FIG. 9A illustrates a case where a value of the target pattern field, '10', indicates a forward triangle region with respect to the source vehicle as a message delivery region. FIG. 9B illustrates a case where a value of the target pattern field, '11', indicates a backward triangle region with respect to the source vehicle as the message delivery region. FIG. 9C illustrates a case where a value of the target pattern field, '01', indicates a backward line region with respect to the source vehicle as the message delivery region. FIG. 9D illustrates a case where a value of the target pattern field, '00', indicates a forward line region with respect to the source vehicle as the message delivery region. A length, angle, or the like of a region indicated by the pattern may be preset based on characteristics of an event of a message.

As illustrated in FIGS. 9A-9D, there may be various target patterns depending on a speed of a vehicle, an event the vehicle desires to deliver, and so forth.

When a fire engine moving out delivers a message for requesting forward vehicles ahead of the fire engine to make way, the forward triangle pattern illustrated in FIG. 9A may be useful.

In another example, when a fire engine or an ambulance moves out, a vehicle not on the same lane among forward vehicles ahead of the fire engine or the ambulance may not be aware of to which lane it has to move. Thus, the fire engine or the ambulance may need to send a notification only to the forward vehicle on the same lane on which the fire engine or the ambulance is moving. That is, the fire engine or the ambulance may need to send the notification in the forward line pattern illustrated in FIG. 9D.

When a traffic accident occurs during driving, the backward triangle pattern illustrated in FIG. 9B may be useful. This is because even when an accident occurs in a close distance, a vehicle traveling on a lane far from the lane on which the accident occurs may not need to be notified of the accident.

In platoon driving in a line (or a sort of group driving), when a source vehicle in the head transmits control information or the like, the source vehicle does not need to request a vehicle on a different lane to unnecessarily deliver and relay a message, such that transmission of the message in the backward line pattern illustrated in FIG. 9C may be useful.

Figure 10A:
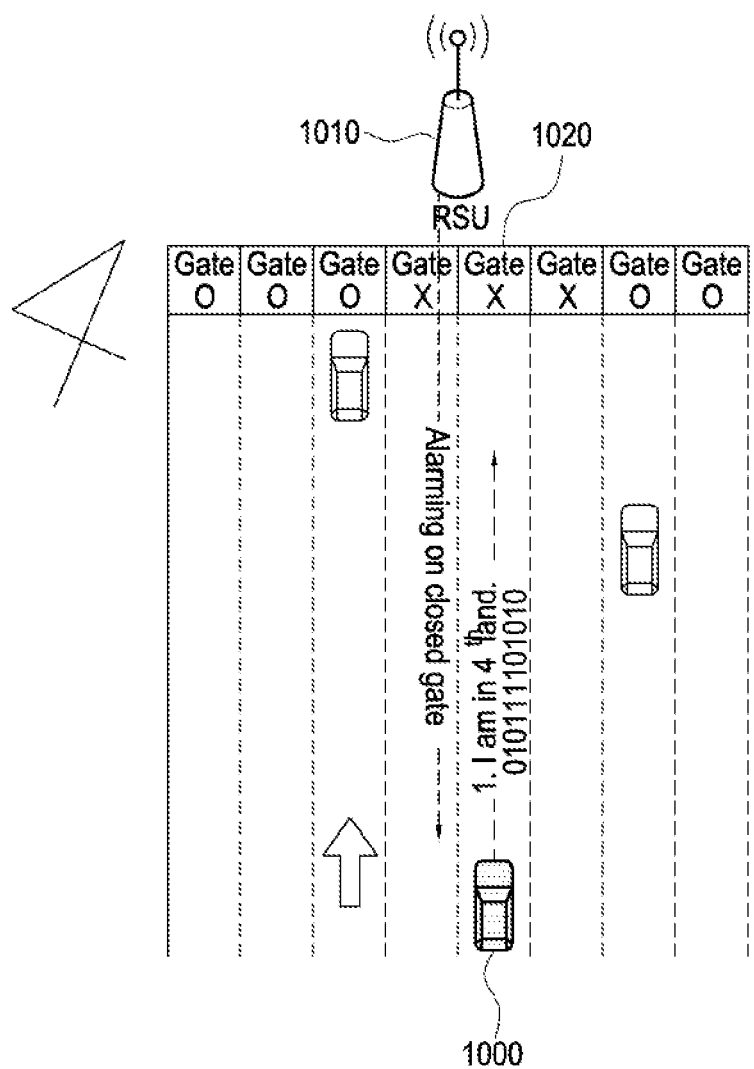
FIG. 10A illustrates a road about which a road side unit (RSU) notifies gate information by using a code according to the present disclosure.

FIG. 10A illustrates a road about which a road side unit (RSU) notifies gate information by using a code according to the present disclosure.

FIG. 10A shows an example where the RSU notifies an opening/closing state of a tollgate of a highway. That is, the code according to the present disclosure may be used to notify a lane to which a high-pass system (indicating a system for paying a toll of a toll road without stopping through wireless communication) is applied or opening/closing of the tollgate on an express way. The tollgate is frequently opened/closed, such that a navigation device may have a difficulty in providing real-time opening/closing information of the tollgate.

On the express way, the number of lanes suddenly increases in a tollgate region, and a driver of a vehicle may not be easily able to check, by naked eyes, a tollgate on a lane on which the vehicle is traveling. In this case, once a vehicle 1000 broadcasts a code including location information thereof, an RSU 1010 located near the tollgate may receive the location information of the vehicle 1000. Thus, taking a current state of the lane on which the vehicle is traveling into account, the RSU 1010 delivers information of a tollgate 1020 corresponding to the lane, an alarm, a message for directing the vehicle 1000 in a correct direction, or the like to the vehicle 1000. On the express way, since the vehicle is traveling at high speed, the vehicle stays in the tollgate region for a very short time. Thus, visual indication of pass possibility (X/O) is indicated on the traveling lane or audible notification of pass possibility is used.

Figure 10B:
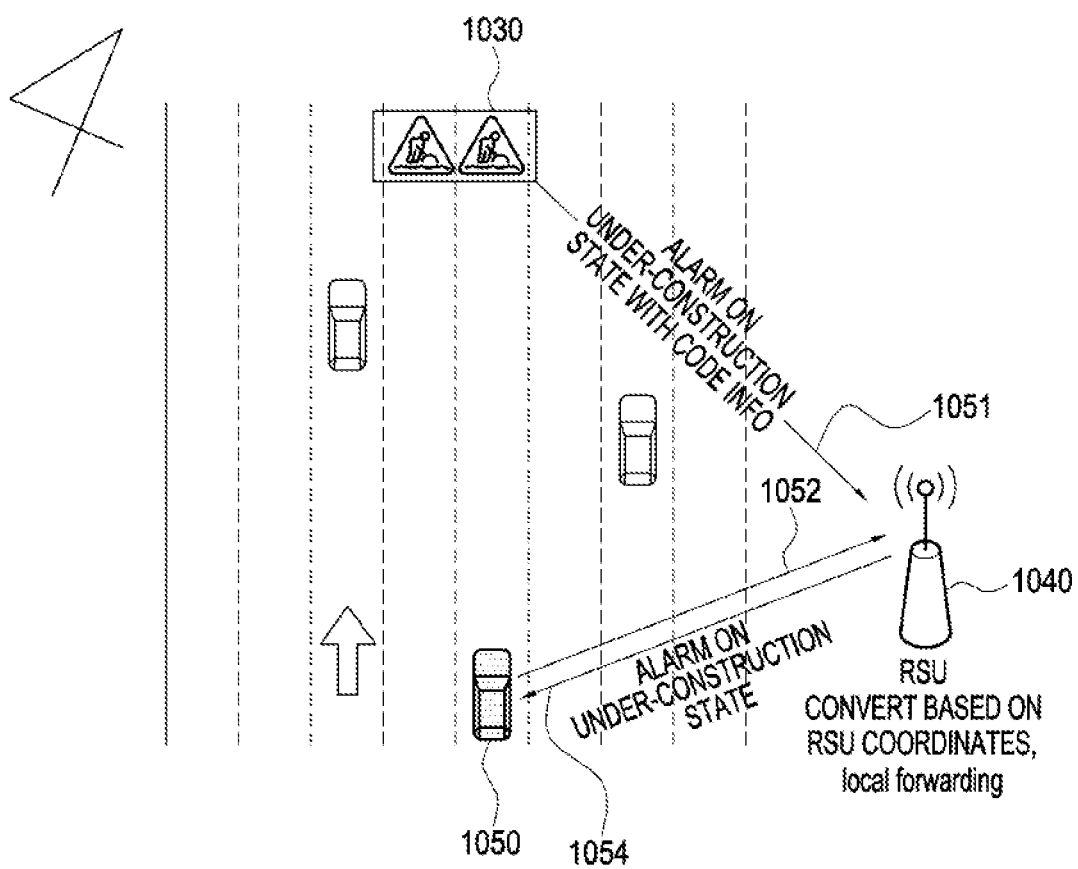
FIG. 10B illustrates a road about which an RSU notifies an under-construction state by using a code according to the present disclosure.

FIG. 10B illustrates a road about which the RSU notifies an under-construction state by using a code according to the present disclosure.

The code according to the present disclosure may be used for the RSU to notify a lane under construction. It may be useful to notify information about the lane under construction only to a vehicle running on that lane, such that the RSU may send an alarm indicating the under-construction state of the lane only to the vehicle on that lane.

A vehicle 1030 on a construction site provides information about the lane under construction to an RSU 1040 in operation 1051. Once a vehicle 1050 running on the lane broadcasts a code including location information thereof to the RSU 1040 in operation 1052, the RSU 1040 delivers an alarm indicating the under-construction state of the lane to the vehicle 1050 by using the information about the lane under construction in operation 1054.

To deliver the alarm to the vehicle 1050, the RSU 1040 may use a dedicated channel or may broadcast an alarm message by using a location code including the location of the vehicle 1050.

Figure 11C:
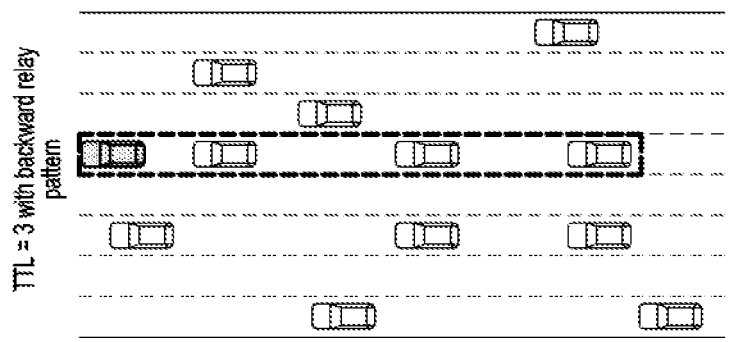
FIGS. 11A-11C illustrate a road when the number of hops of relay transmission according to the present disclosure is limited.
Figure 11B:
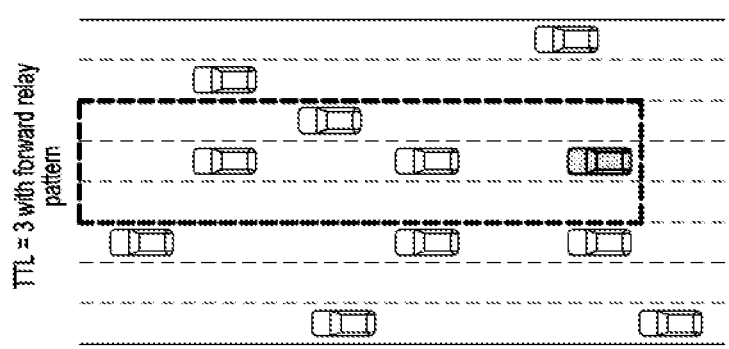
Figure 11A:
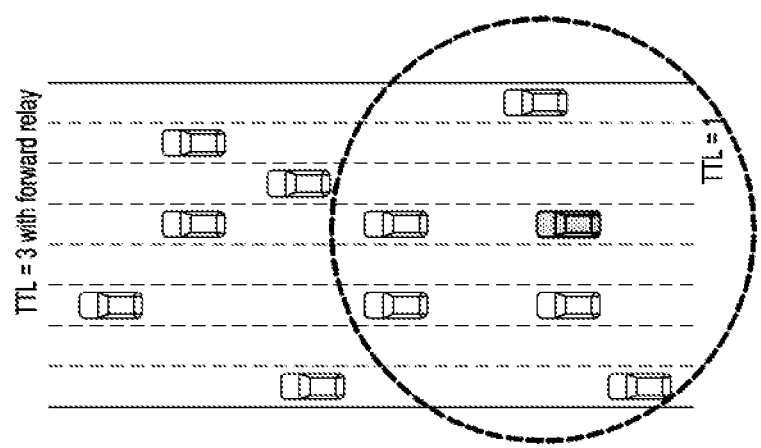

FIGS. 11A-11C illustrate a road when the number of hops of relay transmission according to the present disclosure is limited.

It is necessary to limit the number of hops to prevent unlimited extension of message relay using a relay node. A time to live (TTL) field exists in an IP header, and the number of hops in message relay according to the present disclosure may be limited by using TTL information.

Once a receiving UE having read the TTL field determines that the receiving UE is a receiving and relay target, the receiving UE reduces a value in the TTL field by 1, reconstructs a packet, and relay-transmits the reconstructed packet. For example, the receiving UE may determine itself as a receiving and relay target when the TTL field has a value more than or equal to 2, and when the TTL field has a value of 1, the receiving UE may not perform transmission any more.

When reconstructing the packet for relay transmission, the receiving UE uses code information included in the received message. In this way, a target receiving region may be maintained as initially intended by a source UE. By combining the code with the value of the TTL field, relay reception/delivery for various regions may be performed.

FIG. 11A illustrates a relay region when a source UE delivers a message by setting a value of a TTL field to 1 without a limitation on a target direction or a target pattern.

FIG. 11B illustrates a relay region when a source UE delivers a message by setting three forward lanes as a target pattern and setting a value of a TTL field to 3.

FIG. 11C illustrates a relay region when a source UE delivers a message by setting a backward line pattern as a target pattern and setting a value of a TTL field to 3.

Figure 12:
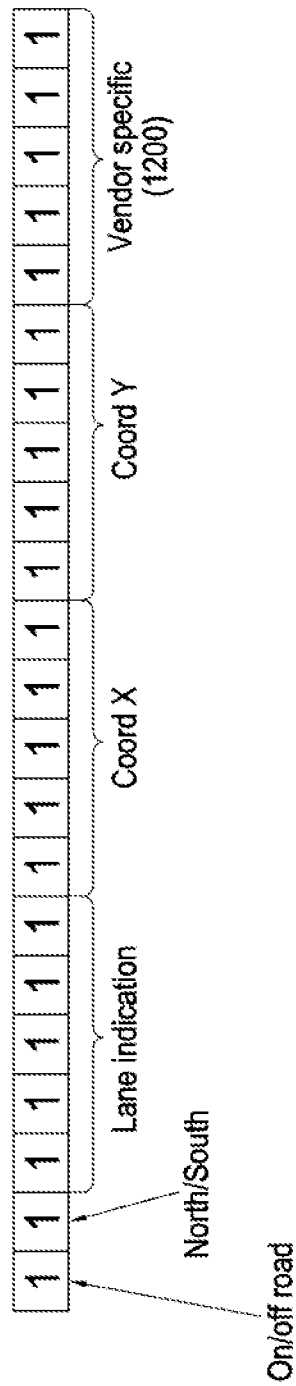
FIG. 12 illustrates a case where a code according to the present disclosure includes a vendor specific field.

FIG. 12 illustrates a case where a code according to the present disclosure includes a vendor specific field.

The code according to the present disclosure may further include a vendor specific field 1200 in addition to a field indicating a location of a vehicle. For example, a separate code may be assigned to each vendor (or model). Thus, when sending a message, a vehicle may designate only a vehicle of a particular vendor (or particular model) as a receiving target. A value of the vendor (model) specific field is previously configured information and may be shared in advance between vehicles. For example, a value of a particular field '11111' may mean a vehicle of BMW®, a value '11001' may mean a vehicle of Hyundai Motors®, and a value '00001' may mean a vehicle of Benz®.

Figure 13:
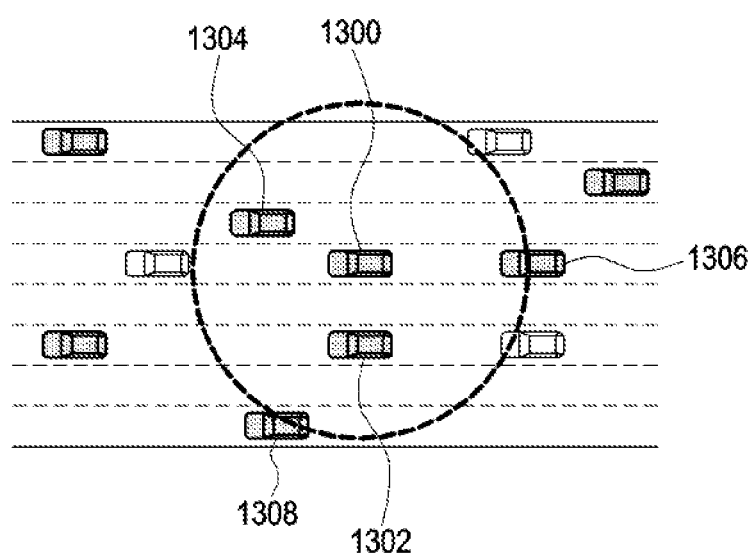
FIG. 13 illustrates a road on which a vehicle sending a message using a code including a vendor specific field according to the present disclosure is running.

FIG. 13 illustrates a road on which a vehicle sending a message using a code including a vendor specific field according to the present disclosure is running.

In FIG. 13, only vehicles from the same vendor A are shaded. For example, a message sent from a vehicle 1300 produced by the vendor A includes a vendor specific field in which a value indicating 'vendor A' is set. Thus, only vehicles 1302, 1304, 1306, and 1308 belonging to the A vendor group may receive or relay the message. When a safety-related message is specific to a particular vendor, the vendor specific field may provide an environment in which only corresponding vehicles may exchange the message with each other. This message also needs location information, and a vehicle belonging to the group may exchange the message with the others by using a location code of a representative vehicle of the group.

Selectively, a lane detection algorithm may be used to improve accuracy in information exchange between vehicles of a particular vendor (and a particular model). The code according to the present disclosure may be used in vehicle information exchange for the lane detection algorithm.

Figure 14:
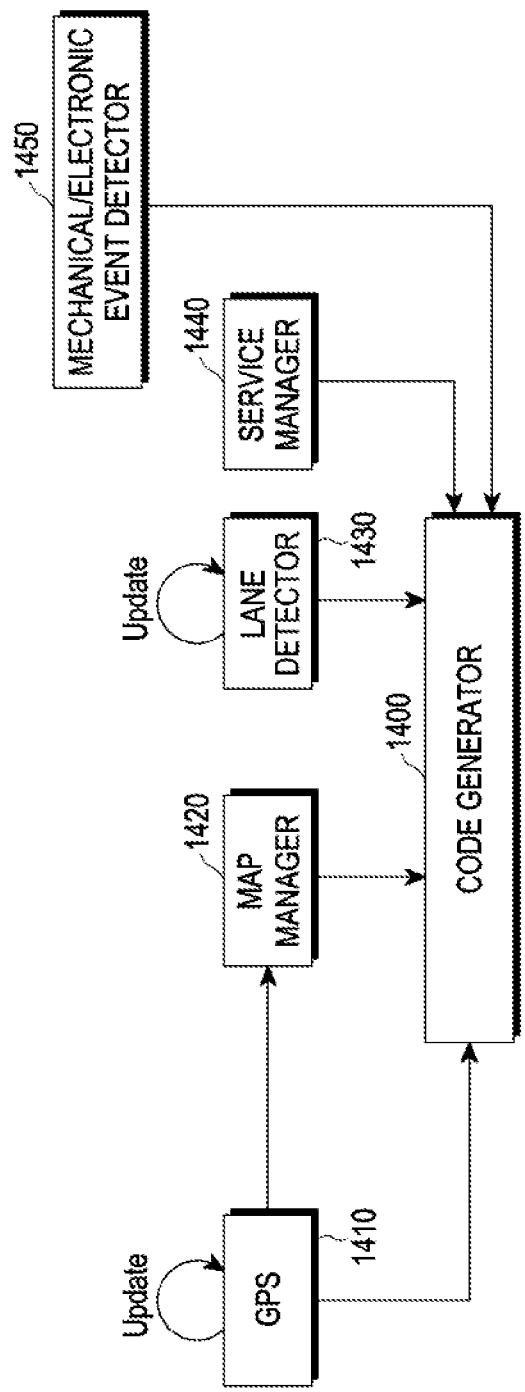
FIG. 14 is a diagram illustrating a code generation operation according to the present disclosure.

FIG. 14 is a diagram illustrating a code generation operation according to the present disclosure.

A UE according to the present disclosure may include a code generator 1400 that performs the code generation operation. The code generator 1400 is electrically connected with at least one of a GPS 1410, a map manager 1420, a lane detector 1430, a service manager 1440, and a mechanical/electronic event detector 1450 to receive at least one information and to generate a code based on the at least one information. The code generator 1400 updates (regenerates) a code each time when input information is updated.

The GPS 1410 updates coordinates indicating a location of the UE (or vehicle) periodically or upon occurrence of an event. When obtaining updated coordinates information, the GPS 1410 processes the coordinates information and delivers only partial coordinates information to the code generator 1400. The GPS 1410 may deliver the (unprocessed) coordinates information to the map manager 1420 or a navigation system.

The map manager 1420 calculates a traveling direction vector of a UE (or a vehicle), determines whether the UE (or vehicle) is on the road or off the road, on which floor of multi-floor roads the UE (or vehicle) is traveling, and a traveling direction of the UE (or vehicle) (for example, up/down), and delivers the determination result to the code generator 1400.

The lane detector 1430 detects a lane on which the UE (or vehicle) is running periodically or upon occurrence of an event and delivers the detected lane to the code generator 1400.

The mechanical/electronic event detector 1450 monitors an event such as a mechanical/electronic malfunction or accident of the UE (or vehicle), generates a message relevant to the event, and delivers information about a target direction (or a target region or a target pattern) needed by the message to the code generator 1400.

The service manager 1440 generates a message of a type irrelevant to a mechanical/electronic state of the UE (or vehicle) and delivers information about a target direction (or a target region or a target pattern) needed by the message to the code generator 1400. The message of the type irrelevant to the mechanical/electric state may be, for example, message proving, a discovery message, or other messages of a service level that are irrelevant to the mechanical/electronic state of the vehicle.

Figure 15:
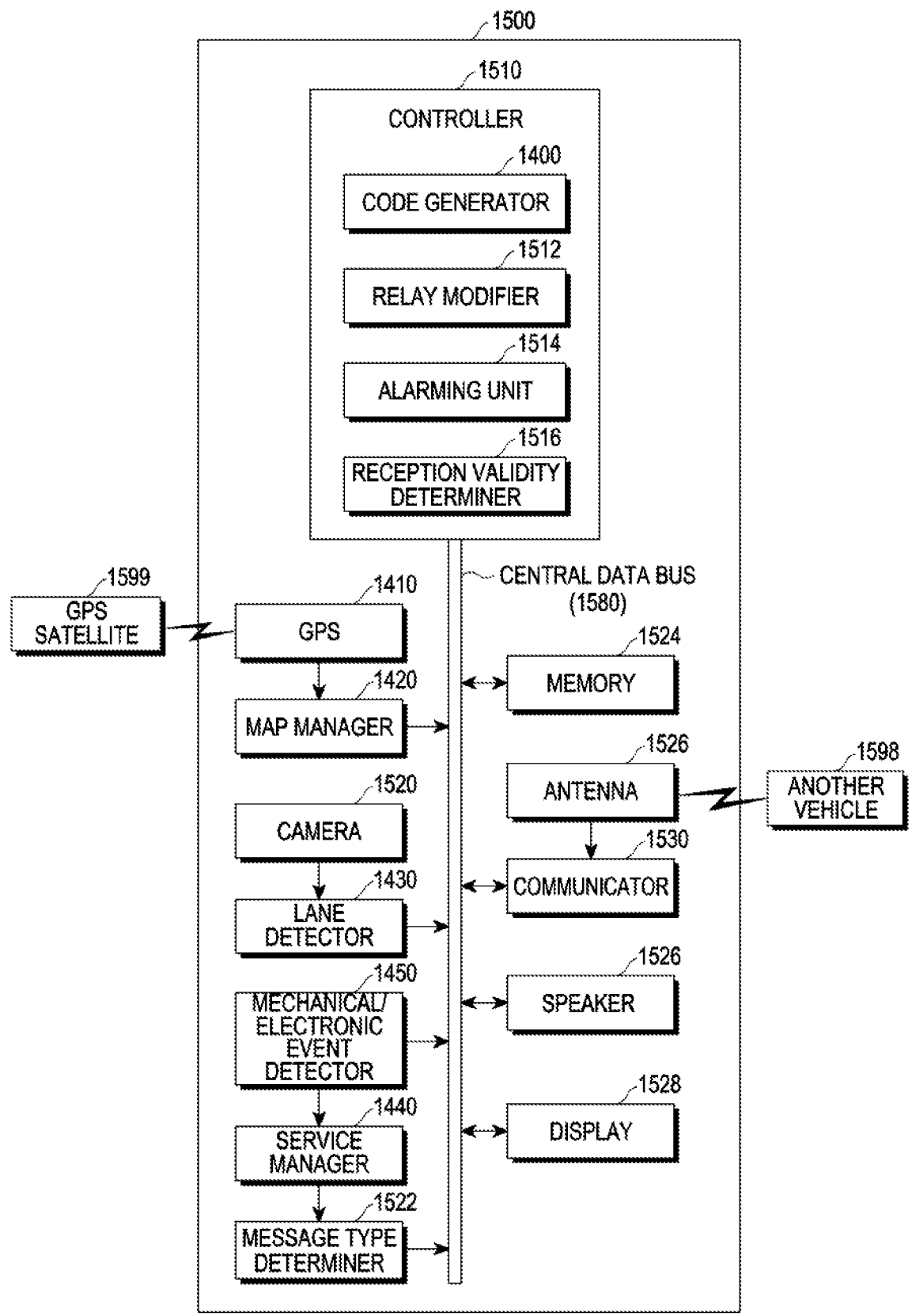
FIG. 15 is a block diagram of a structure of a UE communicating using a code according to the present disclosure.

FIG. 15 is a block diagram of a structure of a UE communicating using a code according to the present disclosure.

A UE (or vehicle) 1500 according to the present disclosure may be implemented by including at least one of components illustrated in FIG. 15.

The GPS 1410 monitors a signal sent from an external GPS satellite 1599 and recognizes a location of the UE 1500 as coordinates. The GPS 1410 delivers the recognized coordinates information to the map manager 1420.

The map manager 1420 includes map information, calculates on-road/off-road information, information about a floor of a traveling road, and traveling direction information of the UE by using the coordinates information, and delivers the same to a central data bus 1580.

A camera 1520 captures an external road condition of the UE (or vehicle) and delivers a captured image to the lane detector 1430.

The lane detector 1430 detects a lane on which the vehicle is currently traveling by using a computer vision algorithm and delivers lane information to the central data bus 1580.

The mechanical/electronic event detector 1450 periodically or aperiodically monitors the mechanical/electronic state of the UE. Upon occurrence of an event, the mechanical/electronic event detector 1450 delivers a message relevant to the event to the service manager 1440 or to the central data bus 1580. When the message is relevant to urgency, the mechanical/electronic event detector 1450 may send the message directly to the code generator 1400.

The service manager 1440 generates a message that is irrelevant to the mechanical/electronic event or receives a message from the mechanical/electronic event detector 1450. Once receiving the message from the mechanical/electronic event detector 1450, the service manager 1440 generates a message of a related application level. The service manager 1440 delivers the application-level message to a message type determiner 1522.

The message type determiner 1522 determines a target direction (or a target region or target pattern) of the received message. The determined target direction information is delivered to the central data bus 1580.

A memory 1524 is used to calculate and store various location-related information.

An antenna 1526 is used to sense/receive a signal sent from another vehicle 1598 outside the UE 1500 or to send a signal generated by a communicator 1530.

The communicator 1530 receives a signal through the antenna 1526 and converts the received signal into information. The communicator 1530 delivers the received information to a controller 1510. The communicator 1530 may perform wireless communication using a communication technology such as Wireless Fidelity (WiFi), mobile broadband (1G-5G), or Bluetooth®.

Depending on a message received from an external UE, an alarm may be expressed in the form of sound, an image, or the like. A speaker 1532 outputs an alarm to a user in the form of sound under control of the controller 1510. A display 1528 outputs an alarm to the user in the form of an image on a screen under control of the controller 1510.

The central data bus 1580 is used as a path to exchange information of various components and a control signal with the controller 1510.

The controller 1510 controls operations of generating a code to send a message, determining whether to relay a received message, and notifying the received message to the user. In the present disclosure, all of the operations of the UE (or vehicle) to be described may be understood as being performed by a control operation of the controller 1510.

The controller 1510 may include at least one of the code generator 1400, a relay modifier 1512, an alarming unit 1514, and a reception validity determiner 1516. Although other components are illustrated outside the controller 1510, the controller 1510 may include other components therein (for example, the GPS 1410, the map manager 1420, the lane detector 1430, the service manager 1440, the mechanical/electronic event detector 1450, and the communicator 1530).

The code generator 1400 generates a code by using various information delivered through the central data bus 1580 according to various embodiments described above in the present disclosure. The code may be directly used in Layer 2 (for example, a medium access control (MAC) layer) or in an upper layer (for example, an application layer) depending on an implementation method or standards. An example of the use of the code in the upper layer will be described in more detail with reference to FIG. 18.

The reception validity determiner 1516 determines whether the received data is valid for the UE 1500, delivers the data to the alarming unit 1514 when determining that the data is valid, and discards the data when determining that the data is not valid.

The alarming unit 1514 controls the speaker 1532 and the display 1528 to output an alarm in a predefined manner depending on a type of the received message.

The relay modifier 1512 determines whether a valid message received from the other vehicle 1598 needs to be relayed, simultaneously with or sequentially to the determination of the reception validity determiner 1516. If the message needs to be relayed, the relay modifier 1512 may perform packet modification such as changing a value of a TTL field of an IP header. The relay modifier 1512 generates a packet to be relayed and delivers the generated packet to the communicator 1530.

Figure 16:
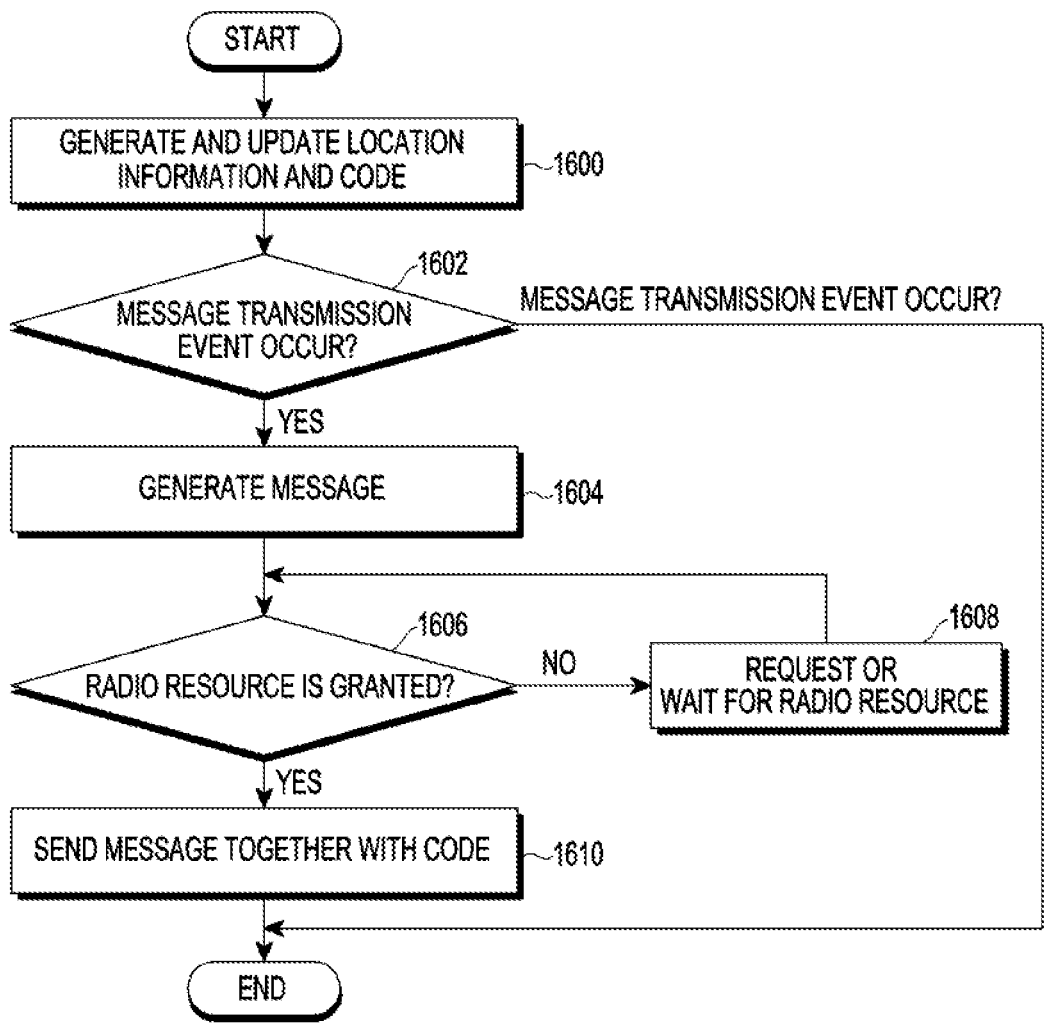
FIG. 16 is a flowchart of a method for sending a message by a UE according to the present disclosure.

FIG. 16 is a flowchart of a method for sending a message by a UE according to the present disclosure.

The UE (or a vehicle) generates location information and a code corresponding thereto in operation 1600. The UE updates (or regenerates) the location information and the code periodically or upon occurrence of an event.

The UE determines whether an event needing message transmission occurs in operation 1602. That is, the UE determines whether an event requiring transmission of a message including the generated code occurs.

When the UE determines that the message transmission event occurs, the UE generates the message in operation 1604. For example, when a moving distance made by change of a location of the UE is greater than or equal to a threshold value, the UE determines that an event needing transmission of a new message occurs and generates the message.

The UE determines whether a radio resource for message transmission is granted in operation 1606.

When the radio resource is not granted, the UE requests a radio resource for message transmission or waits for grant of the radio resource in operation 1608.

Once the radio resource is granted, the UE sends the message including the code generated based on the location information of the UE in operation 1610. Selectively, the UE may further perform an operation of determining whether the message is the latest message or updating the message. This is because when the location of the UE is changed while waiting for the grant of the radio resource, the non-updated message may not accurately reflect the current state of the UE.

Figure 17:
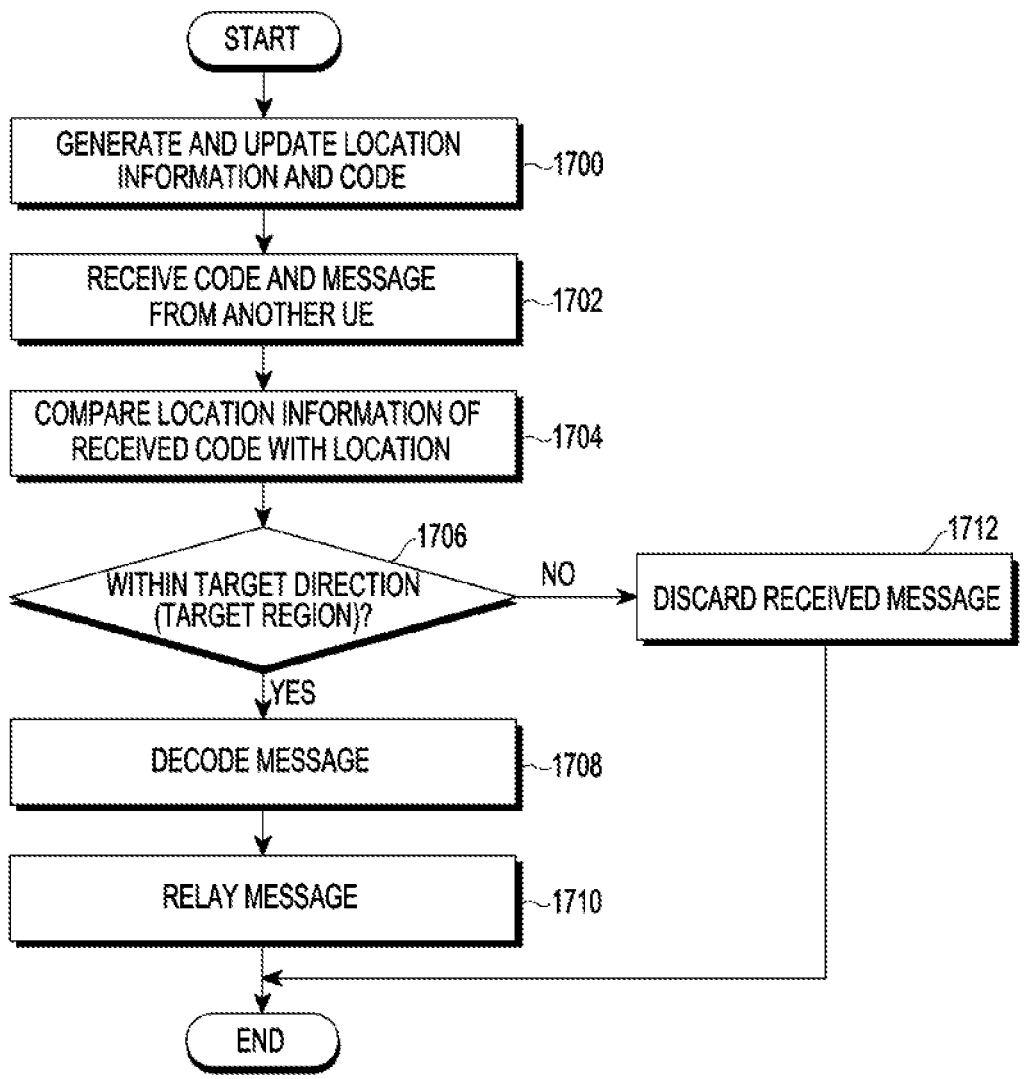
FIG. 17 is a flowchart of a method for receiving a message by a UE according to the present disclosure.

FIG. 17 is a flowchart of a method for receiving a message by a UE according to the present disclosure.

The UE (or a vehicle) generates location information and a code corresponding thereto in operation 1700. The UE updates (or regenerates) the location information and the code periodically or upon occurrence of an event.

The UE receives a message including a code from another UE (or another vehicle) in operation 1702.

The UE compares location information indicated by the code included in the message with its own location information in operation 1704. In the comparison operation, a relative location may be calculated by using the location information indicated by the code and map information.

The UE determines whether its location is within a target direction (or a target region) indicated by the code in operation 1706.

When the location of the UE is within the target direction, the UE decodes the message in operation 1708. The UE may further perform an operation of outputting an alarm based on the message. The UE relays the received message in operation 1710. The UE may perform message modification such as reducing a value of a TTL field in an IP header.

When the location of the UE is not within the target direction, the UE discards the received message in operation 1712.

Figure 18A:
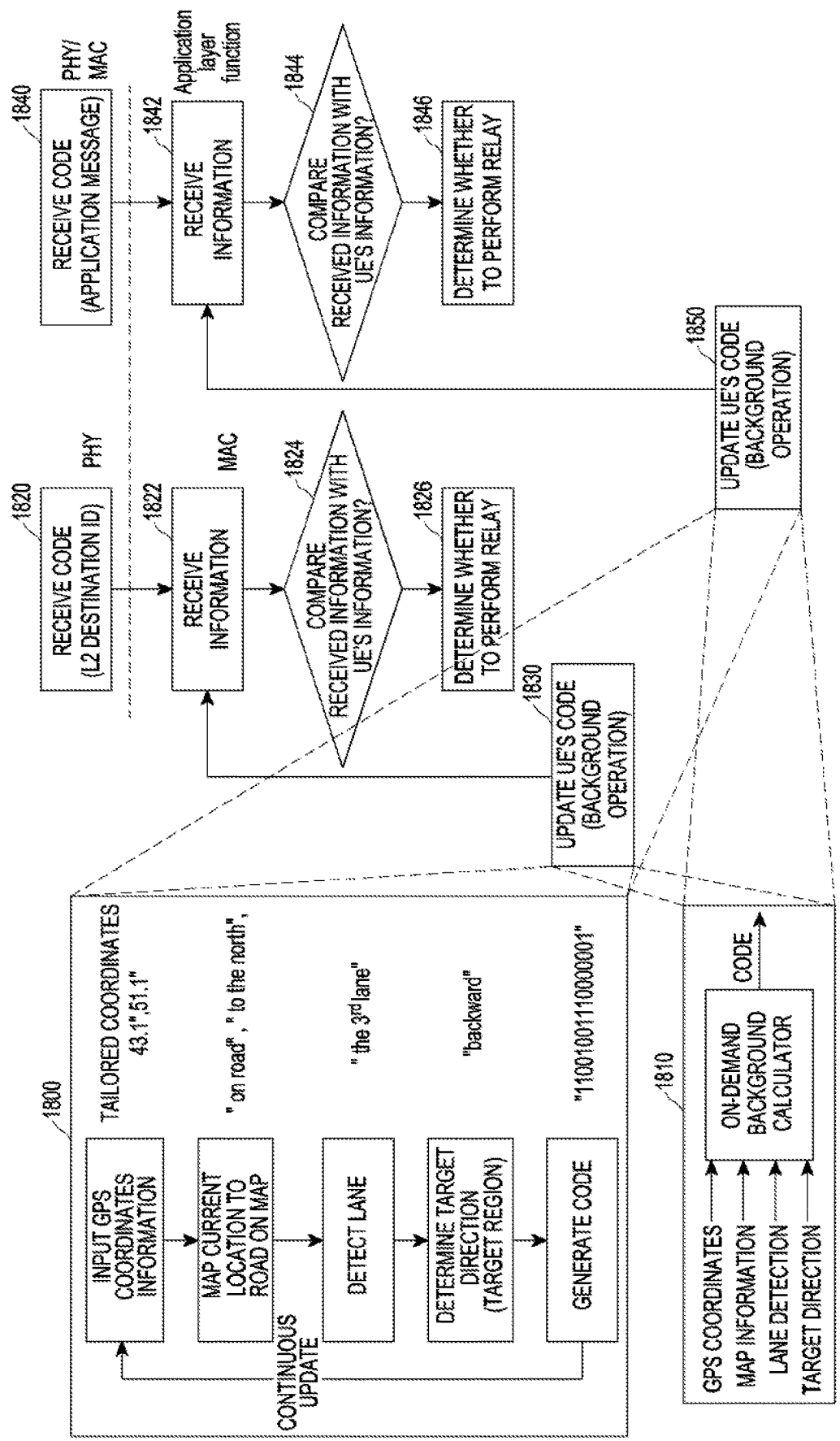
FIG. 18A illustrates a relationship between a code generation operation by a receiving UE according to the present disclosure and a communication protocol.

FIG. 18A illustrates a relationship between a code generation operation by a receiving UE according to the present disclosure and a communication protocol.

When a UE receives a code in operation 1820 or 1840, the code may be used in an L2 layer (MAC layer) in operations 1822, 1824, and 1826 or in an upper layer (application layer) in operations 1842, 1844, and 1846. In this case, the UE has to update its code based on a location thereof in operation 1830 or 1850. The code update operations 1830 and 1850 may be performed as background operations like a continuous (periodic) update operation 1800 or on-demand background calculation 1810.

Figure 18B:
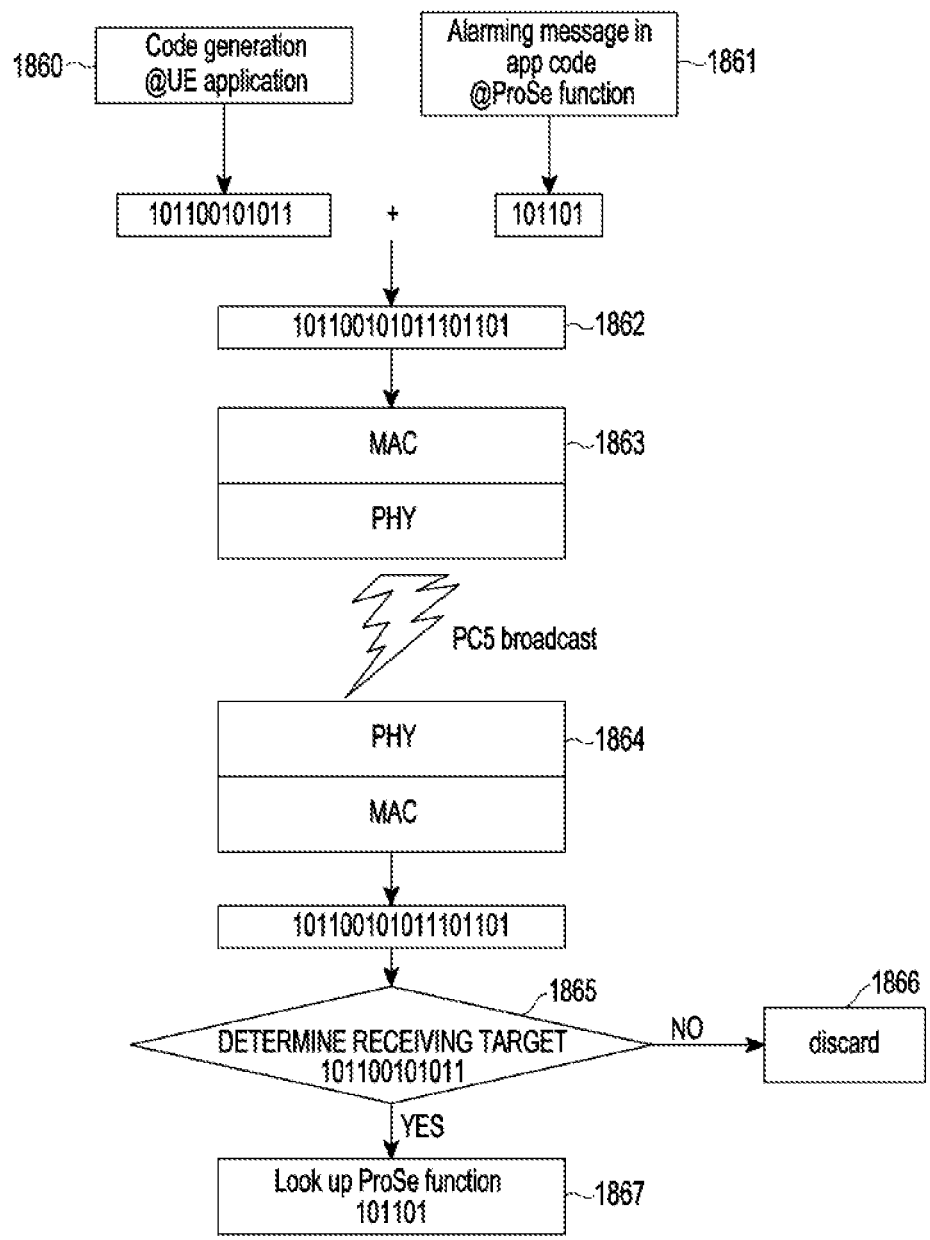
FIG. 18B illustrates a case where a code according to the present disclosure is used in a device-to-device (D2D) discovery channel.

FIG. 18B illustrates a case where a code according to the present disclosure is used in a device-to-device (D2D) discovery channel.

For example, the code according to the present disclosure may be used in a discovery channel of communication standards related to Proximity Service (ProSe) defined in the 3GPP.

A code 1862 generated by combining a location code 1860 generated by an application of the UE with an alarm message in an application code of a ProSe function 1861 is broadcast through a PC5 interface via an MAC/PHY module 1863. The UE receives the code through a PHY/MAC module 1864, analyzes the code, and determines whether the UE is a receiving target in operation 1865. When the UE is a receiving target, the UE may search for the code in the ProSe function to obtain the alarm message, but when the UE is not a receiving target, the UE may discard the code.

Figure 18C:
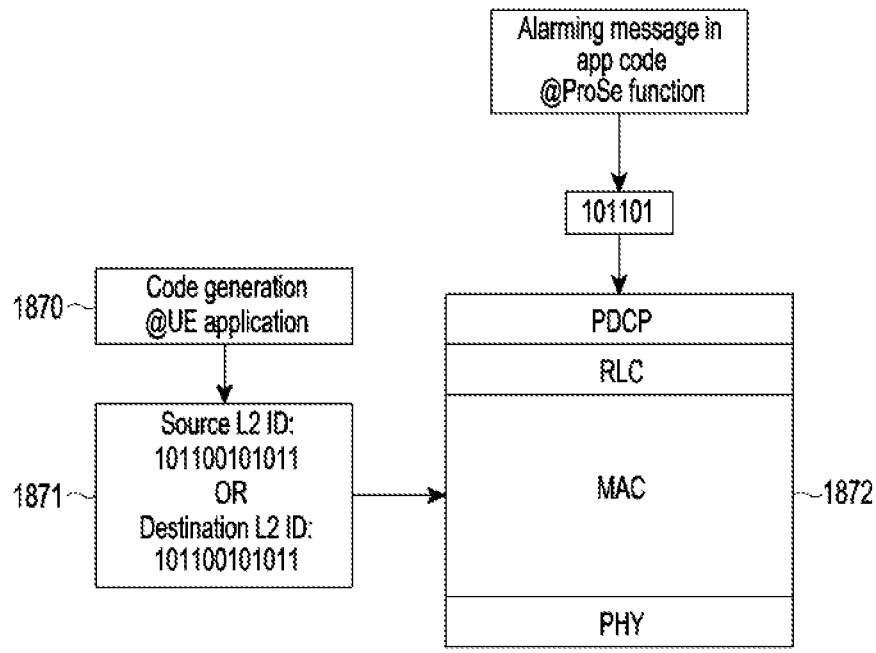
FIG. 18C illustrates a case where a code according to the present disclosure is used in a communication channel.

FIG. 18C illustrates a case where a code according to the present disclosure is used in a communication channel.

For example, the code according to the present disclosure may be used in a communication channel of communication standards related to 3G/4G defined in the 3GPP. FIG. 18C illustrates in more detail operations 1820 through 1826 of FIG. 18A.

A location code 1870 generated in an application of the UE may be a source L2 ID or destination L2 ID 1871. The location code 1870 is input to an MAC layer module 1872 in a communication channel of the UE and may be used in the UE together with information input through an upper layer message.

Figure 18D:
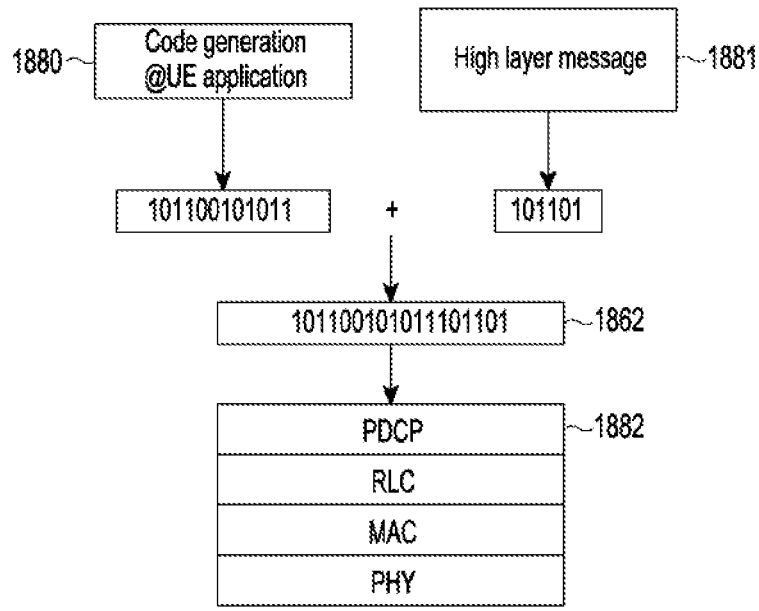
FIG. 18D illustrates another case where a code according to the present disclosure is used in a communication channel.

FIG. 18D illustrates another case where a code according to the present disclosure is used in a communication channel.

For example, the code according to the present disclosure may be used in a commercial communication channel. FIG. 18D illustrates in more detail operations 1840 through 1846 of FIG. 18A.

A location code 1880 generated in the application of the UE is input to an application layer that is an upper layer with respect to a PDCP layer 1882, together with information received through an upper layer message 1881 and is used in the UE.

Figure 19:
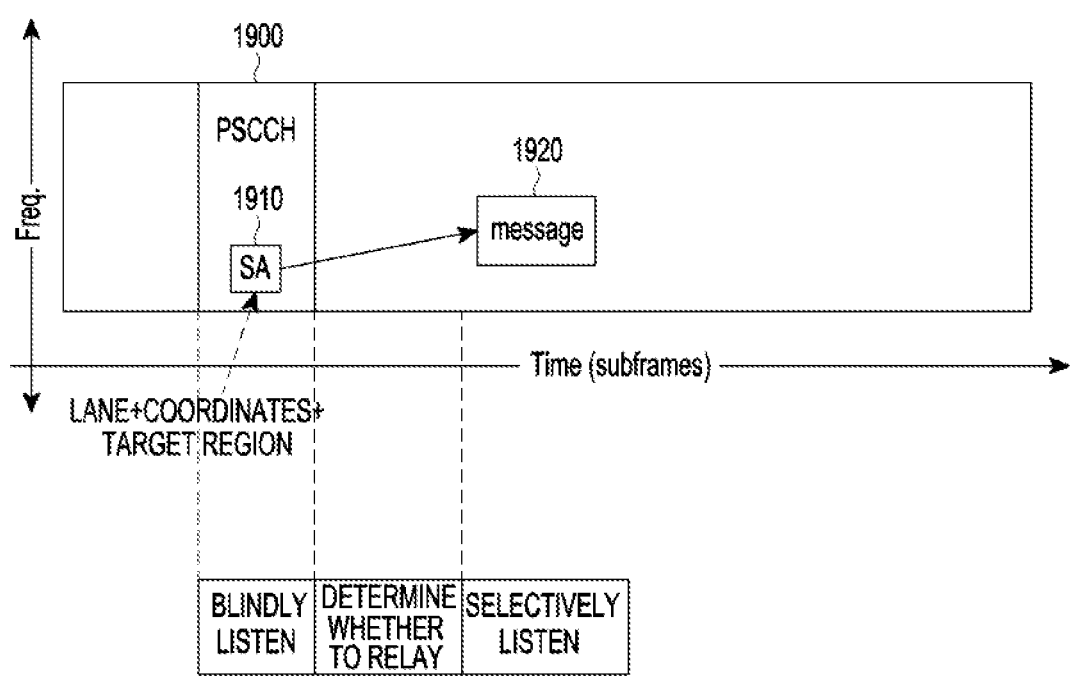
FIG. 19 illustrates a resource structure when a code according to the present disclosure is used in a physical layer.

FIG. 19 illustrates a resource structure when a code according to the present disclosure is used in a physical layer.

The code according to the present disclosure may be used in the physical layer, instead of being a Layer 2 ID. The code may be used like a scheduling assignment (SA) 1910 existing on a physical side link control channel (PSCCH) 1900 of a D2D communication system. That is, the source UE generates the code and carries the generated code together with actual scheduling information (that is, time and frequency resource information) through the SA 1910.

A nearby UE has to blindly listen to the SA 1910. Thus, the nearby UE reads the code in the SA 1910 and determines whether the nearby UE is within a target region indicated by the code. When being within the target region, the UE reads a message 1920 in a resource indicated by the scheduling information included in the SA 1910. Selectively, the UE relays the message 1920.

Figures 20A, 20B:
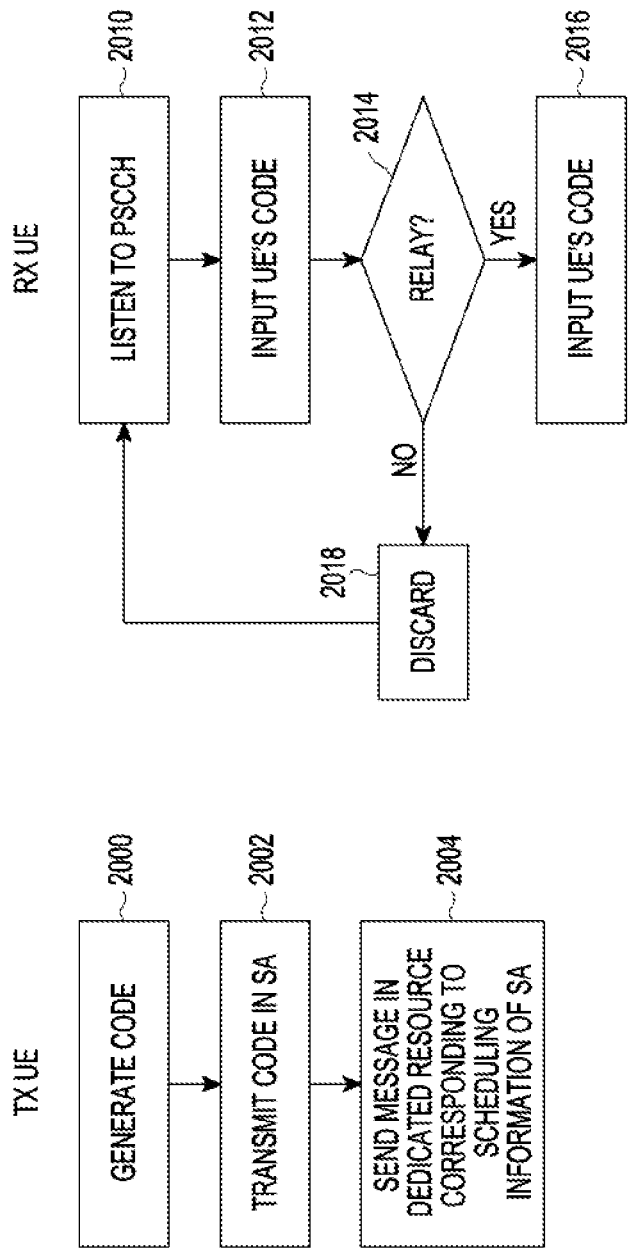
FIGS. 20A and 20B illustrate flowcharts of a transmission method and a reception method when a code according to the present disclosure is transmitted through a scheduling assignment (SA) of a physical side link control channel (PSCCH)

FIGS. 20A and 20B illustrate flowcharts of a transmission method and a reception method when a code according to the present disclosure is transmitted through an SA of a PSCCH.

FIG. 20A illustrates a code transmission method using an SA.

The UE generates the code in operation 2000.

The UE transmits the code together with scheduling information through an SA by using a granted radio resource in operation 2002. The UE is granted the radio resource. When there is no radio resource, the radio resource may be requested.

Thus, the UE sends a message related to the code in a dedicated resource indicated by the scheduling information in operation 2004.

FIG. 20B illustrates a code reception method using an SA.

The UE first listens to a PSCCH (in particular, the SA) in operation 2010.

The UE receives its code in operation 2012.

The UE determines whether to receive and relay the message by comparing its code with a code included in the SA (particular, by using a target direction) in operation 2014. The determination may be performed in an L2 layer or an application layer. The UE may determine whether to relay the message by further taking a TTL field value of an IP header into account.

When determining to relay the message, the UE listens to the message in the resource indicated by the SA and relays the message in operation 2016.

When determining not to relay the message, the UE discards the code read in the SA in operation 2018.

The code according to the present disclosure may also be used in UE-to-UE relay in the PTT service.

Figure 21:
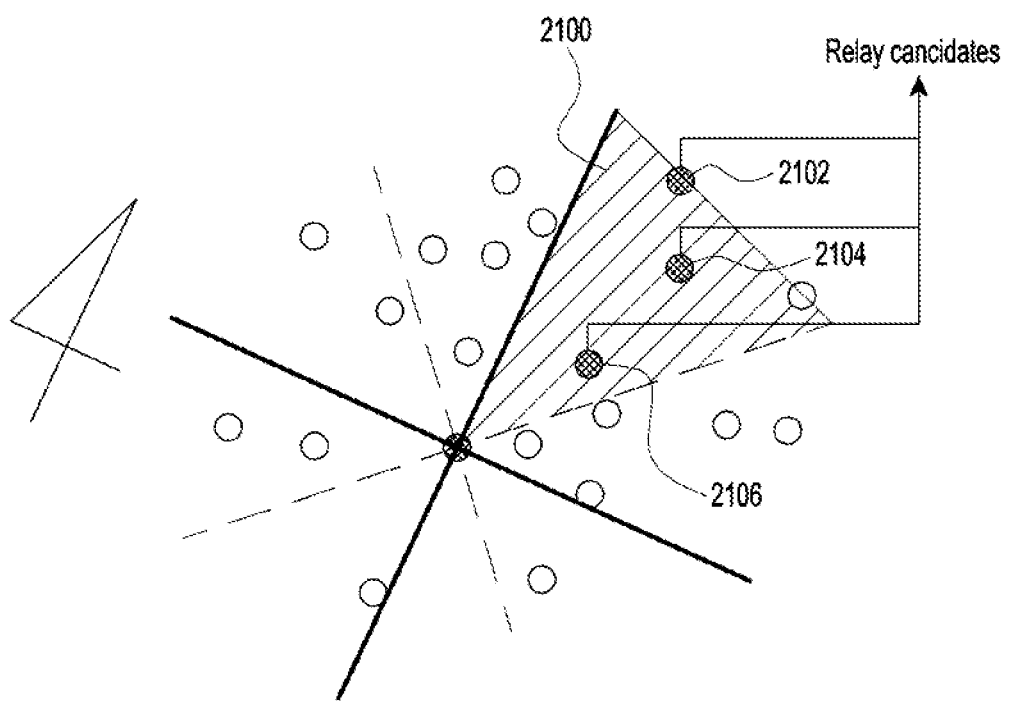
FIG. 21 illustrates a principle that a relay candidate is determined in a push to talk (PTT) service using a code according to the present disclosure.

FIG. 21 illustrates a principle that a relay candidate is determined in the PTT service using a code according to the present disclosure.

All UEs are assumed to know their GPS location information each other, and a PTT application may provide direction information for relay discovery announcement. The relay discovery announcement message may have the code as well as an application message. Then, a geometry 2100 indicated by the message indicates particular relay candidates 2202, 2204, and 2206 relay the data or message.

Figure 22:
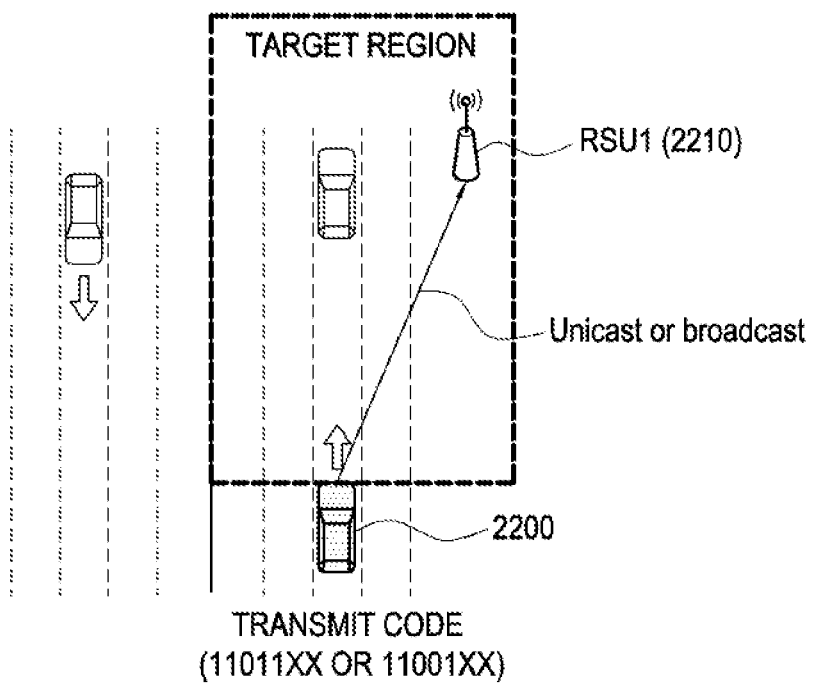
FIG. 22 illustrates a case where an RSU is a relay UE in a vehicle to everything (V2X) service using a code according to the present disclosure.

FIG. 22 illustrates a case where an RSU is a relay UE in a V2X service using a code according to the present disclosure.

In the V2X service, the RSU may be a relay UE using the code according to the present disclosure. A vehicle 2200 sets a code (in particular, a target region) such that an RSU1 2210 becomes a relay UE. The RSU1 2210 calculates a location of a target receiver based on the code. The RSU1 2210 relays a message received from the vehicle 2200. The RSU1 2210 may be in a state connected to a network, and in this case, a relay operation is a type of a UE-to-network relay operation.

Figure 23:
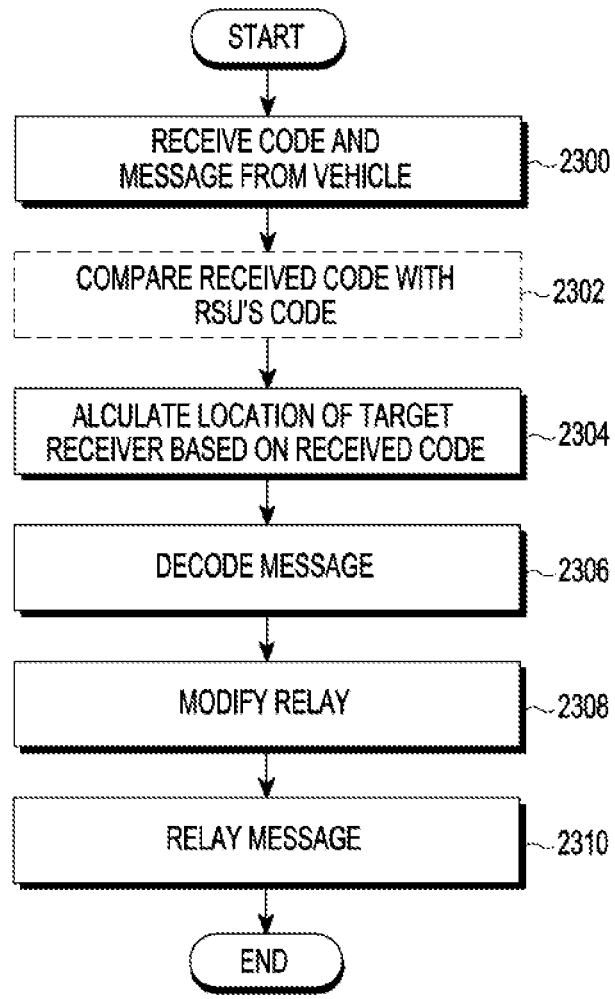
FIG. 23 is a flowchart of a relay method by an RSU using a code according to the present disclosure.

FIG. 23 is a flowchart of a relay method by an RSU using a code according to the present disclosure.

The RSU receives a code and a message from a vehicle in operation 2300.

The RSU may have its location code or not. Selectively, when the RSU has its location code, the RSU compares the received code with its location code in operation 2302. Message reception of the RSU from the vehicle may be determined (approved) based on the location code of the RSU. When the RSU does not have its location code, the RSU receives all messages sent from vehicles within a proximity distance.

The RSU calculates a location of a target receiver based on the received code in operation 2304.

The RSU decodes the message in operation 2306.

The RSU modifies a relay message in operation 2308. For example, the RSU may modify a relay-related field (for example, such as a TTL field) in an IP header or regenerate a relay message by using the calculated location information of the target receiver.

The RSU relays the message by using the modified field and a new target code in operation 2310.

The code according to the present disclosure may also be used in UE-to-network relay in the PTT service.

Figure 24:
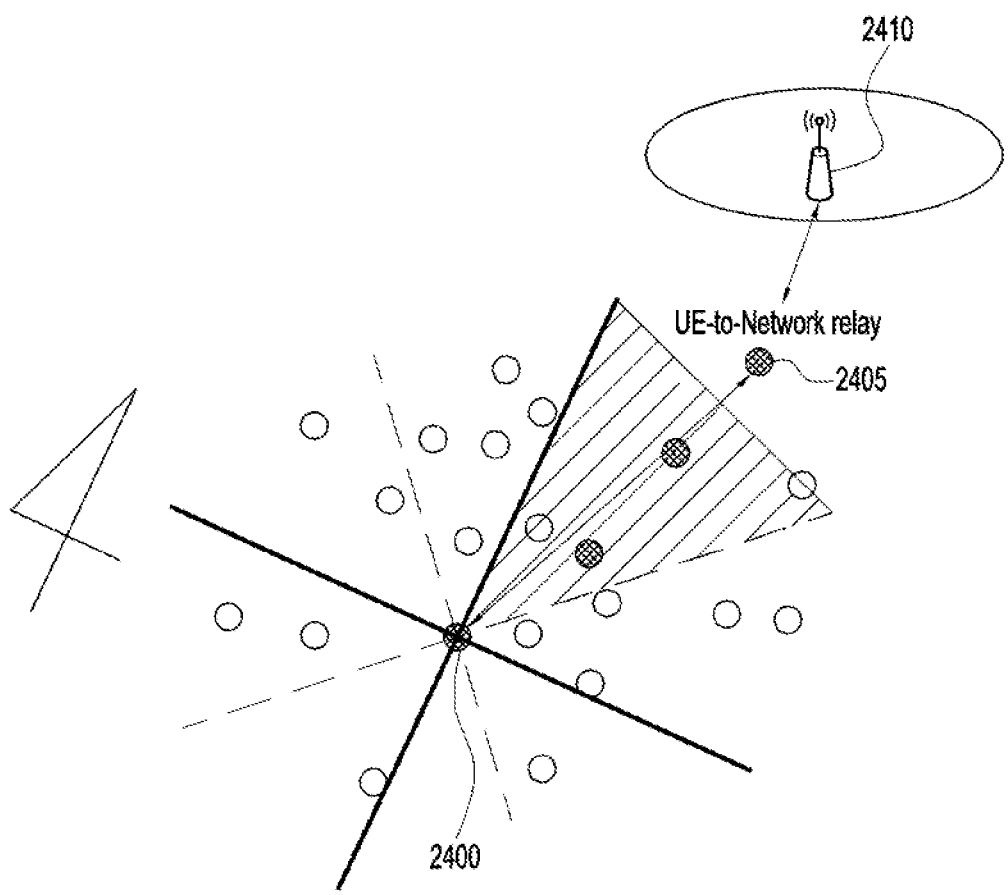
FIG. 24 illustrates a case where an eNB is determined as a relay candidate in a PTT service using a code according to the present disclosure.

FIG. 24 illustrates a case where an eNB is determined as a relay candidate in a PTT service using a code according to the present disclosure.

In a PTT service system illustrated in FIG. 24, once a source UE 2400 broadcasts a code and a message, a relay node 2405 in a particular location receives and relays the message. A next hop of the relay node 2405 may be an eNB 2410. The relay operation may be a UE-to-network relay operation.

In V2X communication, a relative speed between vehicles may cause a Doppler shift phenomenon in an orthogonal frequency region.

Figure 25A:
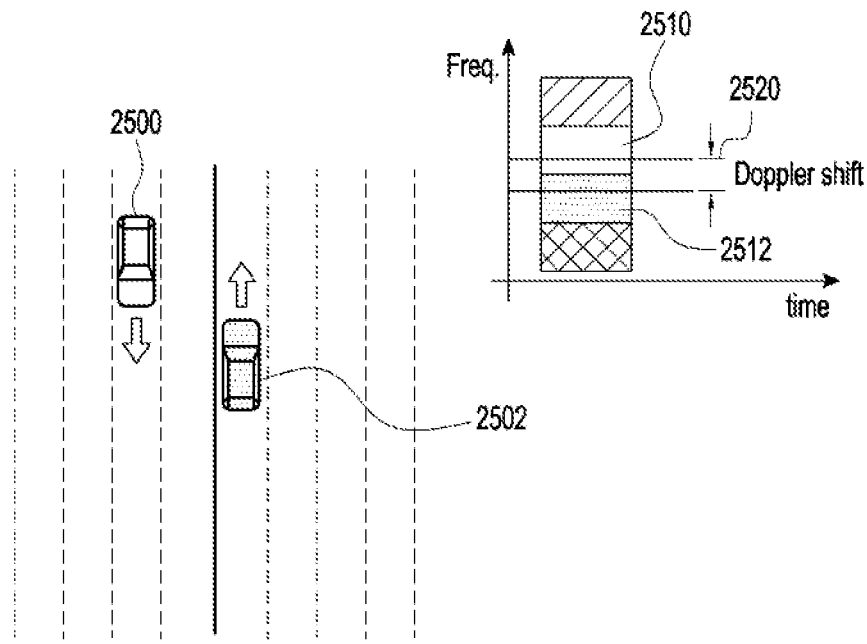
FIGS. 25A and 25B illustrate a scheme for solving the Doppler shift phenomenon by using a code according to the present disclosure.
Figure 25B:
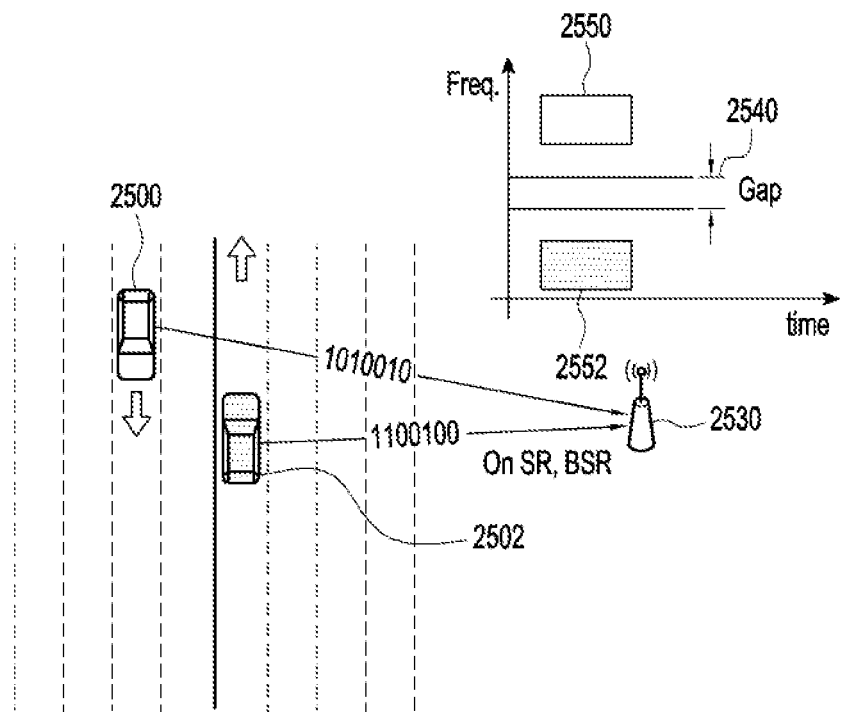

FIGS. 25A and 25B illustrate a scheme for solving the Doppler shift phenomenon by using a code according to the present disclosure.

A UE in a stationary state or in a low-speed moving state is not much affected by the Doppler shift phenomenon, but a relative speed between high-speed moving vehicles (in particular, vehicles moving at high speed in opposite directions) may cause the serious Doppler shift phenomenon. As illustrated in FIG. 25A, a first vehicle 2500 and a second vehicle 2502 that run in opposite directions are allocated a first frequency carrier 2510 and a second frequency carrier 2512 that are divided in the orthogonal frequency region, respectively. In a part 2520 of a frequency carrier used for transmission by the first vehicle 2500 and the second vehicle 2502, interference may occur due to the Doppler shift. In a mission critical service (a service in which a success in a mission is very critical), the interference problem needs to be prevented.

FIG. 25B is a view for describing a method for preventing the Doppler shift phenomenon. Once location codes of the first vehicle 2500 and the second vehicle 2502 are given to an RSU 2530, the RSU 2530 allocates radio frequency resources 2550 and 2552 to the vehicles 2500 and 2502, respectively, with a frequency gap 2540 corresponding to the Doppler shift expected in the frequency domain. The RSU 2530 determines the frequency gap 2540 by considering the Doppler shift with respect to each traveling direction in two frequency regions for the first vehicle 2500 and the second vehicle 2502. In this case, in the frequency resources 2550 and 2552 to be used by the first vehicle 2500 and the second vehicle 2502, the Doppler shift phenomenon does not occur, and in V2X communication of the vehicles 2500 and 2502, interference caused by the Doppler shift may be avoided. Location codes of the vehicles 2500 and 2502 may be transmitted to the RSU 2530 through a scheduling request (SR) message or a buffer status report (BSR) message, or the location code may be sent to the RSU 2530 in a random-access procedure. Meanwhile, when the location codes transmitted from the vehicles indicate that the vehicles are running at intersections, then the vehicles may not run at high speeds, such that a frequency gap may not be needed in frequency resource allocation.

Next, a description will be made of a scheme to allocate an IP address in advance in UE-to-UE communication through relay.

After a relay selection process using the code according to the present disclosure ends, an IP connection process may be performed. In the IP connection process, authorization, IP address allocation, and so forth are time-consuming operations, increasing a UE-to-UE (end-to-end) delay time. Thus, the present disclosure proposes an IP address pre-allocation method. This method may be applied when relay node selection is needed.

When a UE communicates data with a target UE through a relay UE, the UE needs three types of discovery messages to find out the target UE. Those discovery messages include group member discovery messages sent from all UEs, a relay discovery solicit message sent from a source UE to a target UE for requesting relay, and a response message with respect to the relay discovery solicit message.

The group member discovery message may include a message type (2 bits), a discovery type (2 bits), a UE ID (24 bits), and announcer information (Announcer info) (application level ID).

The relay discovery solicit message may include a message type (2 bits), a discovery type (2 bits), a UE ID (24 bits), discovering UE information (discoverer info) (application level ID), and target information (target info).

The response message may include a message type (2 bits), a discovery type (2 bits), a UE ID (24 bits), and discovered UE information (discoveree info) (application level ID).

The respective UEs exchange the three messages with each other, thereby maintaining information of neighboring UEs (for example, pair information of ProSe UE ID and a discovered UE).

Both the target info included in the relay discovery solicit message and the discoveree info included in the response message may be used to identify the target UE. Thus, another UE receiving the relay discovery solicit message or the response message may check whether neighboring node information of the UE includes information about the target UE. When the information about the target UE is included in the neighboring node information, the other UE determines to perform relay, allocates an IP address to the source node and the target node, and transmits the allocated IP addresses through a response message.

For IP allocation, authorization has to be performed and information for authorization is needed. Thus, the present disclosure proposes that the relay discovery solicit message should include a registered UE ID (that is, international mobile subscriber identity (IMSI). The present disclosure also proposes that the response message should include at least one of random challenge (RAND), authorization token for home subscriber server (AUTN HSS), and a local IP pair of a source UE/target UE.

Figure 26:
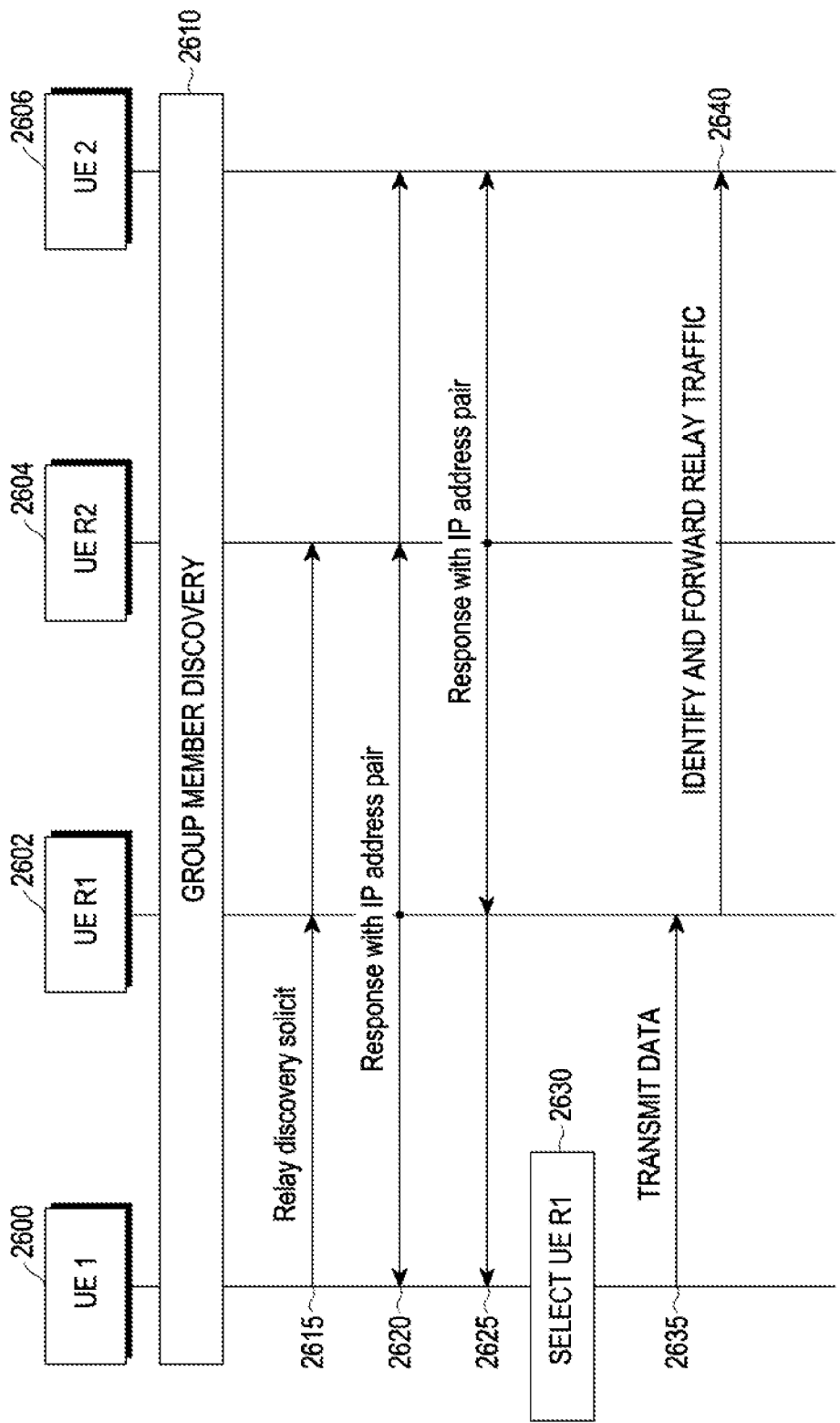
FIG. 26 is a signal flow of a UE-to-UE relay communication method using IP address pre-allocation according to the present disclosure.

FIG. 26 is a signal flow of a UE-to-UE relay communication method using IP address pre-allocation according to the present disclosure.

UE1 (source UE) 2600 having recognized out of coverage (OOC) sends a group member discovery message in operation 2610. By doing so, the UE1 2600 may determine reachability to a UE2 (target UE) 2606.

The UE1 2600 determines whether the UE1 2600 has a path to the UE2 2606. When the UE1 2600 does not have the path, the UE1 2600 may perform at least one operations as below.

The UE1 2600 sends a relay discovery solicit message in operation 2615. The relay discovery solicit message may include information such as a name of a target UE (that is, UE2), a registered UE ID (for example, an IMSI) of a corresponding UE (that is, UE1), and so forth.

Relay candidates UE-R1 2602 and UE-R2 2604 send response messages with respect to the relay discovery solicit messages, respectively, in operations 2620 and 2625. The response message may include a name of the target UE, a source IP address allocated to the source UE, and a destination IP address allocated to the target UE.

An arbitrary UE (that is, a target UE) listens to the response message, and when discovering its name in the response message, memorizes (stores) a source IP address, a destination IP address, and an L2 UE ID of a UE (that is, a relay candidate UE) having sent the response message. The target UE sends a pre-authorization message including the IMSI.

The UE1 2600 selects a relay UE (for example, the UE-R1 2602) by using reference signal received power (RSRP) or other upper layer information in operation 2630. The authorization information obtained from the response message is transmitted to the selected UE-R1 2602 for authorization. In this way, an authorization time needed after relay UE determination and a time consumed for IP allocation may be reduced.

The UE1 2600 generates a data packet and transmits the data packet to the UE-R1 2602 in operation 2635. The UE1 2600 may generate the data packet by using the obtained local source IP address, destination IP address, UE1 L2 ID, and UE-RL2 ID.

The UE-R1 2602 monitors received data. Once receiving a data packet having a source IP address and a destination IP address that are pre-allocated before, the UE-R1 2602 identifies the received data as relay traffic and redirects the relay traffic to the UE2 2602 by using the source IP address, the destination IP address, the UE-R L2 ID, and the target UE L2 ID in operation 2640.

The UE2 2602 receives the relayed data and decodes the packet.

Figure 27:
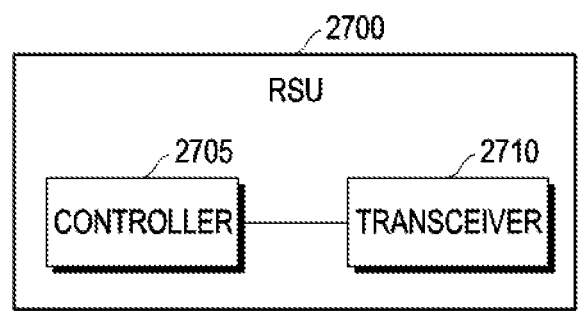
FIG. 27 is a block diagram of an RSU according to the present disclosure.

FIG. 27 is a block diagram of an RSU according to the present disclosure.

An RSU 2700 may include a controller 2705 and a transceiver 2710. The controller 2705 controls operations of the RSU 2700. The controller 2705 may be understood as an entity for performing RSU's operations described in the present disclosure. The transceiver 2710 transmits and receives a signal with another UE (or a vehicle) under control of the controller 2705.

It should be noted that a code diagram, a structural diagram of a road system, an exemplary view of a transmission/reception method, an exemplary view of a signal flow shown in FIGS. 1 through 27 are not intended to limit the scope of the present disclosure. In other words, all of information, fields, components or operations shown in FIGS. 1 to 27 should not be construed to be essential components for implementation of the present disclosure, and even though only some data units, operations or components are included, the present disclosure may be implemented without departing from the scope and spirit of the disclosure.

The above described operations may be implemented by providing a memory device storing a corresponding program code to an entity, a function, a BS, a UE, or a vehicle device of a communication system, a function, or a specific structural element of the UE. That is, the controller of the entity, the function, the BS, the UE, or the vehicle device carries out the above described operations by reading and executing the program code stored in the memory device by means of a processor or a central processing unit (CPU).

As described herein, various components or modules in the entity, function, BS, UE, or vehicle device may be operated using a hardware circuit, e.g., a complementary metal oxide semiconductor-based logic circuit, firmware, software, and/or using a hardware circuit such as a combination of hardware, firmware, and/or software embedded in a machine-readable medium. For example, various electric configurations and methods may be carried out by using electric circuits such as transistors, logic gates, and an application specific integrated circuit (ASIC).

While embodiments of the present disclosure have been described, various changes may be made without departing the scope of the present disclosure. Therefore, the scope of the present disclosure should be defined by the appended claims and equivalents thereof, rather than by the described embodiments.

The invention claimed is:

1. A method of communicating of a relay-based terminal in a communication system including a vehicle, the method comprising:
    obtaining global positioning system (GPS) coordinates of the vehicle;
    mapping a current position to a road on a map;
    detecting a lane of the vehicle;
    determining a traveling direction of the vehicle based on map information and the GPS coordinates; and
    generating a first location code of the terminal comprising information about the GPS coordinates, the traveling direction, and the lane of the vehicle;
    generating a first message comprising the generated first location code of the terminal;
    receiving, from another vehicle, a second message comprising a second location code from another vehicle, the second location code comprising at least one of target direction information indicating a direction in which the second message is delivered, target region information indicating a region to which the second message is delivered, information about GPS coordinates, a traveling direction, and a lane of the other vehicle;
    comparing the first location code with the second location code by using at least one of the target direction information and the target region information; and
    decoding and relaying the first message based on the comparison.

2. The method of claim 1, further comprising:
    determining an on-road or off-road state of the vehicle based on the map information and the GPS coordinates,
    wherein the first location code is generated to further comprise information about the on-road or off-road state, and wherein the second location code further comprises information about on-road or off-road state of the other vehicle.

3. The method of claim 1, further comprising:
determining a floor of a road on which the vehicle is traveling, based on the map information and the GPS coordinates,
wherein the first location code is generated to further comprise information about the floor of the road, and
wherein the second location code further comprises information about a floor of a road on which the other vehicle is traveling.

4. The method of claim 1, wherein the target region information indicates an index of a target pattern, and the target pattern comprises at least one of a forward line pattern, a backward line pattern, a forward triangle pattern, and a backward triangle pattern.

5. A relay-based terminal in a communication system including a vehicle, the relay-based terminal comprising:
a transceiver; and
a controller configured to:
obtain global positioning system (GPS) coordinates of the vehicle,
map a current position to a road on a map,
detect a lane of the vehicle,
determine a traveling direction of the vehicle based on map information and the GPS coordinates,
generate a first location code of the terminal comprising information about the GPS coordinates, the traveling direction, and the lane of the vehicle,
generate a first message comprising the generated first location code of the terminal,
receive, via the transceiver from another vehicle, a second message comprising a second location code from another vehicle, the second location code comprising at least one of target direction information indicating a direction in which the second message is delivered, target region information indicating a region to which the second message is delivered, information about GPS coordinates, a traveling direction, and a lane of the other vehicle,
compare the first location code with a second location code by using at least one of the target direction information and the target region information, and
decode and relay the first message based on the comparison.

6. The relay-based terminal of claim 5, wherein the controller is further configured to:
determine an on-road or off-road state of the vehicle based on the map information and the GPS coordinates,
wherein the first location code is generated to further comprise information about the on-road or off-road state, and
wherein the second location code further comprises information about on-road or off-road state of the other vehicle.

7. The relay-based terminal of claim 5, wherein the controller is further configured to:
determine a floor of a road on which the vehicle is traveling, based on the map information and the GPS coordinates,
wherein the first location code is generated to further comprise information about the floor of the road, and
wherein the second location code further comprises information about a floor of a road on which the other vehicle is traveling.

8. The relay-based terminal of claim 5, wherein the target region information indicates an index of a target pattern, and the target pattern comprises at least one of a forward line pattern, a backward line pattern, a forward triangle pattern, and a backward triangle pattern.

* * * * *